United States Patent
Jung et al.

(10) Patent No.: US 10,135,594 B2
(45) Date of Patent: Nov. 20, 2018

(54) SCHEDULING METHOD FOR COMMUNICATION NETWORK SUPPORTING UNLICENSED BAND

(71) Applicant: Electronics and Telecommunications Research Institute, Daejeon (KR)

(72) Inventors: Hoi Yoon Jung, Daejeon (KR); Sung Jin Yoo, Daejeon (KR); Jung Sun Um, Daejeon (KR); Seung Keun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 103 days.

(21) Appl. No.: 15/234,278

(22) Filed: Aug. 11, 2016

(65) Prior Publication Data
US 2017/0048884 A1    Feb. 16, 2017

(30) Foreign Application Priority Data

Aug. 13, 2015   (KR) .................. 10-2015-0114763
Aug. 5, 2016    (KR) .................. 10-2016-0100116

(51) Int. Cl.
*H04W 72/12*    (2009.01)
*H04L 5/00*     (2006.01)
*H04L 27/00*    (2006.01)
*H04W 72/04*    (2009.01)

(52) U.S. Cl.
CPC ............ *H04L 5/0053* (2013.01); *H04L 5/001* (2013.01); *H04L 27/0006* (2013.01); *H04W 72/042* (2013.01)

(58) Field of Classification Search
CPC ... H04L 5/001; H04L 5/0053; H04L 27/0006; H04W 72/042

USPC .................. 370/329–345; 455/436–522
See application file for complete search history.

(56) References Cited

U.S. PATENT DOCUMENTS

| | | | | |
|---|---|---|---|---|
| 9,331,826 B2* | 5/2016 | Kim | ................. | H04L 5/001 |
| 9,509,479 B2* | 11/2016 | Yi | ................. | H04W 52/48 |
| 9,854,569 B2* | 12/2017 | Yang | ................. | H04W 72/0413 |
| 2014/0362780 A1 | 12/2014 | Malladi et al. | | |
| 2015/0103777 A1 | 4/2015 | Chen et al. | | |
| 2015/0201431 A1 | 7/2015 | Um et al. | | |
| 2015/0245376 A1 | 8/2015 | Bashar et al. | | |
| 2015/0264699 A1 | 9/2015 | Fwu et al. | | |
| 2015/0305041 A1 | 10/2015 | Kim | | |
| 2016/0050667 A1* | 2/2016 | Papasakellariou | | ............... H04W 74/0808 370/329 |
| 2016/0073344 A1 | 3/2016 | Vutukuri et al. | | |
| 2016/0095134 A1 | 3/2016 | Chen et al. | | |

(Continued)

FOREIGN PATENT DOCUMENTS

KR    10-2016-0013508 A    2/2016

*Primary Examiner* — Man U Phan
(74) *Attorney, Agent, or Firm* — William Park & Associates Ltd.

(57) ABSTRACT

Disclosed is a scheduling method for a communication network supporting an unlicensed band. An operation method of a user equipment (UE) may comprise obtaining a control channel from a partial subframe having a length of less than 1 millisecond in an unlicensed band; obtaining scheduling information from the control channel; and obtaining a data channel indicated by the scheduling information from the partial subframe. Therefore, performance of the communication network can be enhanced.

14 Claims, 13 Drawing Sheets

(56) References Cited

U.S. PATENT DOCUMENTS

2016/0345206 A1* 11/2016 Yerramalli, Sr. ..... H04W 28/12
2017/0019909 A1*  1/2017 Si ........................ H04W 76/048
2017/0034670 A1*  2/2017 Zhang .................... H04W 4/06
2017/0126300 A1*  5/2017 Park ..................... H04B 7/0626
2017/0142743 A1*  5/2017 Yoon .................... H04L 5/0048
2017/0289818 A1* 10/2017 Ng ........................ H04W 16/14
2017/0311322 A1* 10/2017 Kim .................. H04W 72/0446
2017/0367092 A1* 12/2017 Kim .................. H04W 72/0446

* cited by examiner

SCHEDULING METHOD FOR COMMUNICATION NETWORK SUPPORTING UNLICENSED BAND

CROSS-REFERENCE TO RELATED APPLICATIONS

This application claims the benefit and priority to Korean Patent Application No. 10-2015-0114763 filed on Aug. 13, 2015, and Korean Patent Application No. 10-2016-0100116 filed on Aug. 5, 2016 in the Korean Intellectual Property Office (KIPO), the entire contents of which are hereby incorporated by reference.

BACKGROUND

1. Technical Field

The present disclosure relates to a scheduling technology for a communication network, and more specifically, to scheduling methods for a cellular communication (e.g., Long Term Evolution (LTE)) network supporting an unlicensed band.

2. Related Art

Various wireless communication technologies are being developed in accordance with advancement of information communication technologies. Wireless communication technologies may be generally classified into technologies using licensed bands and technologies using unlicensed bands (e.g., industrial-scientific-medical (ISM) band) according to bands used by respective technologies. Since a licensed band is exclusively used by a specific operator, the technology using the licensed band may provide better reliability, communication quality, etc. than that using an unlicensed band.

There exists, as a representative cellular communication technology using the licensed band, a Long Term Evolution (LTE) or LTE-Advanced standardized in a 3$^{rd}$ generation partnership project (3GPP). Thus, a base station or a user equipment (UE) supporting LTE or LTE-Advanced may transmit or receive signals through the licensed band. Also, there exists, as a representative wireless communication technology using the unlicensed band, a wireless local area network (WLAN) defined in IEEE 802.11. Thus, an access point or a station supporting the WLAN may transmit or receive signals through the unlicensed band.

Meanwhile, as mobile traffics are increasing explosively, additional licensed bands are required in order to process such the increasing mobile traffics through licensed bands. However, licensed bands are limited resources. Since a licensed band is obtained usually through an auction held among operators, astronomical investment may be demanded for obtaining the additional licensed bands. In order to resolve the above-described problem, a method for providing LTE or LTE-Advanced services through the unlicensed band may be considered.

In the case that LTE or LTE-Advanced services are provided through the unlicensed band, transmission and reception of signals may occur discontinuously due to use of discontinuous resources. Also, if conventional scheduling methods defined for the licensed bands are applied to the unlicensed band, scheduling of some resources may become impossible.

Meanwhile, this description on the related arts is written for understanding of the background of the present disclosure. Thus, information on other than conventional technologies, which are already known to those skilled in this technology domain to which the technologies of the present disclosure belong, may be included in this description.

SUMMARY

Accordingly, embodiments of the present disclosure provide scheduling methods and apparatuses for a cellular communication network supporting an unlicensed band.

In accordance with the embodiments of the present disclosure, an operation method of a user equipment (UE) in a communication network may be provided. The method may comprise obtaining a control channel from a partial subframe having a length of less than 1 millisecond in an unlicensed band; obtaining scheduling information from the control channel; and obtaining a data channel indicated by the scheduling information from the partial subframe.

Here, the control channel may be a physical downlink control channel (PDCCH) or an enhanced PDCCH (EPDCCH).

Here, the partial subframe may be a start partial subframe or an end partial subframe among a plurality of subframes constituting a transmission burst.

Here, each subframe except the partial subframe in the unlicensed band may comprise a first slot and a second slot each of which comprises orthogonal frequency division multiplexing (OFDM) symbol#0 to symbol#6, and a start OFDM symbol of the partial subframe may correspond to an OFDM symbol#0 included in the second slot.

Here, each subframe except the partial subframe in the unlicensed band may comprise a first slot and a second slot each of which comprises orthogonal frequency division multiplexing (OFDM) symbol#0 to symbol#6, and an end OFDM symbol of the partial subframe may correspond to an OFDM symbol#6 included in the first slot.

Here, when the UE operates based on a semi-persistent scheduling (SPS), the scheduling information may be applied to all subframes belonging to an effective period of the SPS.

Here, when the UE operates based on a semi-persistent scheduling (SPS), control information configured for all subframes belonging to an effective period of the SPS may be transmitted through a subframe to which the control information is applied.

Furthermore, in accordance with the embodiments of the present disclosure, an operation method of a base station in a communication network may be provided. The method may comprise generating scheduling information indicating a resource through which a data channel is transmitted; transmitting a control channel including the scheduling information through a partial subframe having a length of less than 1 millisecond in an unlicensed band; and transmitting the data channel through the resource in the partial subframe, which is indicated by the scheduling information.

Here, the control channel may be a physical downlink control channel (PDCCH) or an enhanced PDCCH (EPDCCH).

Here, the partial subframe may be a start partial subframe or an end partial subframe among a plurality of subframes constituting a transmission burst.

Here, each subframe except the partial subframe in the unlicensed band may comprise a first slot and a second slot each of which comprises orthogonal frequency division multiplexing (OFDM) symbol#0 to symbol#6, and a start OFDM symbol of the partial subframe may correspond to an OFDM symbol#0 included in the second slot.

Here, each subframe except the partial subframe in the unlicensed band may comprise a first slot and a second slot each of which comprises orthogonal frequency division multiplexing (OFDM) symbol#0 to symbol#6, and an end OFDM symbol of the partial subframe may correspond to an OFDM symbol#6 included in the first slot.

Here, when the base station operates based on a semi-persistent scheduling (SPS), the scheduling information may be applied to all subframes belonging to an effective period of the SPS.

Here, when the base station operates based on a semi-persistent scheduling (SPS), control information configured for all subframes belonging to an effective period of the SPS may be transmitted through a subframe to which the control information is applied.

Furthermore, in accordance with the embodiments of the present disclosure, a user equipment (UE) supporting an unlicensed band may be provided. The UE may comprise a processor; and a memory storing at least one command which is executed by the processor, wherein the at least one command may be executed to obtain a control channel from a partial subframe having a length of less than 1 millisecond in an unlicensed band, obtain scheduling information from the control channel, and obtain a data channel indicated by the scheduling information from the partial subframe.

Here, the partial subframe may be a start partial subframe or an end partial subframe among a plurality of subframes constituting a transmission burst.

Here, each subframe except the partial subframe in the unlicensed band may comprise a first slot and a second slot each of which comprises orthogonal frequency division multiplexing (OFDM) symbol#0 to symbol#6, and a start OFDM symbol of the partial subframe may correspond to an OFDM symbol#0 included in the second slot.

Here, each subframe except the partial subframe in the unlicensed band may comprise a first slot and a second slot each of which comprises orthogonal frequency division multiplexing (OFDM) symbol#0 to symbol#6, and an end OFDM symbol of the partial subframe may correspond to an OFDM symbol#6 included in the first slot.

Here, when the UE operates based on a semi-persistent scheduling (SPS), the scheduling information may be applied to all subframes belonging to an effective period of the SPS.

Here, when the UE operates based on a semi-persistent scheduling (SPS), control information configured for all subframes belonging to an effective period of the SPS may be transmitted through a subframe to which the control information is applied.

According to embodiments of the present disclosure, scheduling for a partial subframe in an unlicensed band burst can be performed, and thus resources of an unlicensed band can be utilized effectively. Therefore, performance of a communication network can be enhanced.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION OF THE EMBODIMENTS

Figure 1:
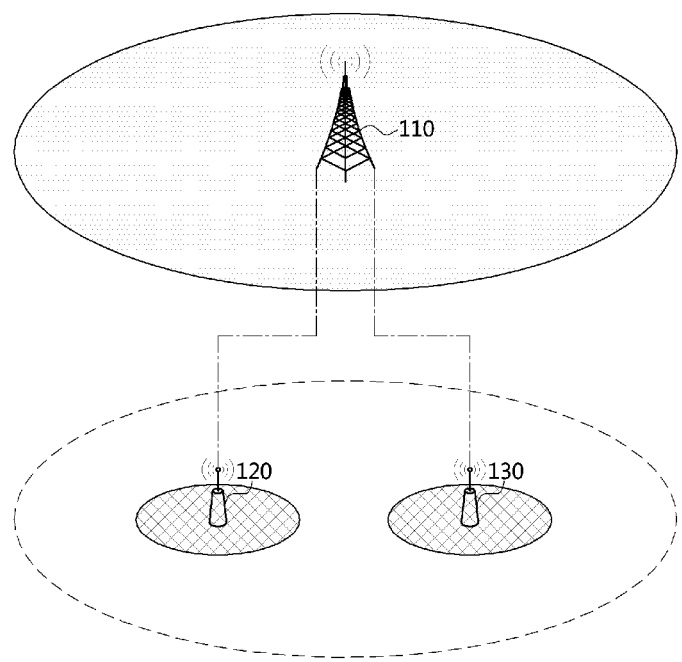
FIG. 1 is a conceptual diagram illustrating a first embodiment of a wireless communication network.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Hereinafter, wireless communication networks to which embodiments according to the present disclosure will be described. However, the wireless communication networks to which embodiments according to the present disclosure are applied are not restricted to what will be described below. That is, embodiments according to the present disclosure may be applied to various wireless communication networks.

FIG. 1 is a conceptual diagram illustrating a first embodiment of a wireless communication network.

Referring to FIG. 1, a first base station 110 may support cellular communications (e.g., Long Term Evolution (LTE), LTE-Advanced (LTE-A), Licensed Assisted Access (LAA), etc. standardized in a $3^{rd}$ Generation Partnership Project (3GPP)). The first base station 110 may support technologies such as a Multiple Input Multiple Output (MIMO) (e.g., Single-User (SU)-MIMO, Multi-User (MU)-MIMO, massive MIMO, etc.), a Coordinated multi-point transmission/reception (CoMP), a Carrier Aggregation (CA), etc. The first base station 110 may operate in a licensed band (F1), and form a macro cell. The first base station 100 may be connected to other base stations (e.g., a second base station 120, a third base station 130, etc.) through ideal backhaul links or non-ideal backhaul links.

The second base station 120 may be located in coverage of the first base station 110. Also, the second base station 120 may operate in an unlicensed band (F3), and form a small cell. The third base station 130 may also be located in coverage of the first base station 110. The third base station 130 may operate in the unlicensed band (F3), and form a small cell. Each of the second base station 120 and the third base station 130 may support a Wireless Local Area Network (WLAN) standardized in an Institute of Electrical and Electronics Engineers (IEEE) 802.11. Each user equipment (UE) connected to the first base station 110 may transmit and receive signals through a CA using the licensed band (F1) and the unlicensed band (F3).

Figure 2:
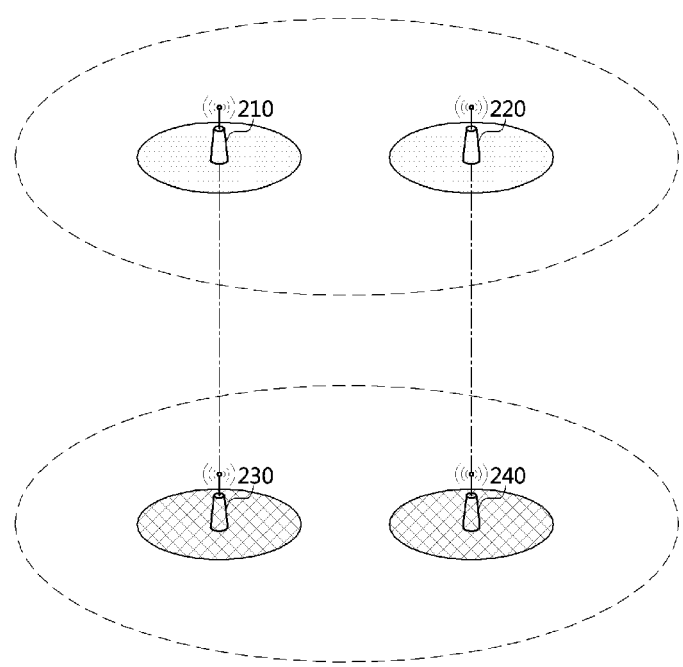
FIG. 2 is a conceptual diagram illustrating a second embodiment of a wireless communication network.

FIG. 2 is a conceptual diagram illustrating a second embodiment of a wireless communication network.

Referring to FIG. 2, each of a first base station 210 and a second base station 220 may support cellular communications (e.g., LTE, LTE-A, LAA, etc.). Each of the first base station 210 and the second base station 220 may support MIMO (e.g., SU-MIMO, MU-MIMO, massive MIMO, etc.), CoMP, CA, etc. Also, each of the base stations 210 and 220 may operate in the licensed band (F1), and form each small cell. Each of the base stations 210 and 220 may be located in coverage of a base station forming a macro cell. The first base station 210 may be connected with a third base station 230 through an ideal backhaul link or a non-ideal backhaul link. Also, the second base station 220 may be connected with a fourth base station 240 through an ideal backhaul link or a non-ideal backhaul link.

The third base station 230 may be located in coverage of the first base station 210. The third base station 230 may operate in the unlicensed band (F3), and form a small cell. The fourth base station 240 may be located in coverage of the second base station 220. The fourth base station 240 may operate in the unlicensed band (F3), and form a small cell. Each of the base stations 230 and 240 may support WLAN standardized in IEEE 802.11. Each of the first base station 210, an UE connected to the first base station 210, the second base station 220, and an UE connected to the second base station 220 may transmit and receive signals through a CA using the licensed band (F1) and the unlicensed band (F3).

Figure 3:
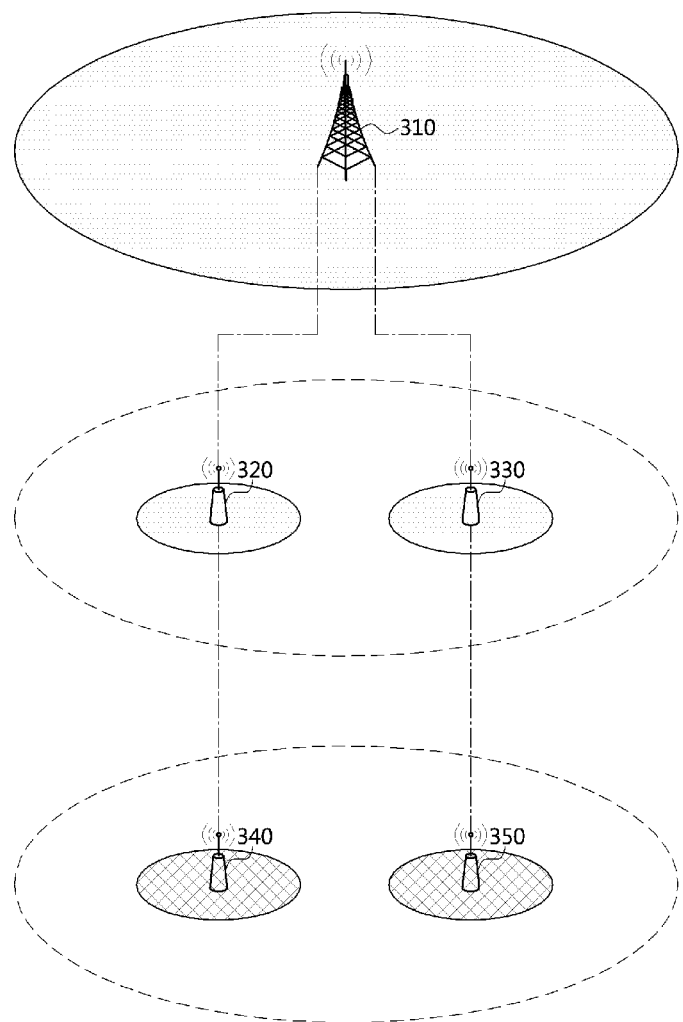
FIG. 3 is a conceptual diagram illustrating a third embodiment of a wireless communication network.

FIG. 3 is a conceptual diagram illustrating a third embodiment of a wireless communication network.

Referring to FIG. 3, each of a first base station 310, a second base station 320, and a third base station 330 may support cellular communications (e.g., LTE, LTE-A, LAA, etc.). Each of the first base station 310, the second base station 320, and the third base station 330 may support MIMO (e.g., SU-MIMO, MU-MIMO, massive MIMO, etc.), CoMP, CA, etc. The first base station 310 may operate in the licensed band (F1), and form a macro cell. The first base station 310 may be connected to other base stations (e.g., the second base station 320, the third base station 330, etc.) through ideal backhaul links or non-ideal backhaul links. The second base station 320 may be located in coverage of the first base station 310. The second base station 320 may operate in the licensed band (F1), and form a small cell. The third base station 330 may be located in coverage of the first base station 310. The third base station 330 may operate in the licensed band (F1), and form a small cell.

The second base station 320 may be connected with a fourth base station 340 through an ideal backhaul link or a non-ideal backhaul link. The fourth base station 340 may be located in coverage of the second base station 320. The fourth base station 340 may operate in the unlicensed band (F3), and form a small cell. The third base station 330 may be connected with a fifth base station 350 through an ideal backhaul link or a non-ideal backhaul link. The fifth base station 350 may be located in coverage of the third base station 330. The fifth base station 350 may operate in the unlicensed band (F3), and form a small cell. Each of the base stations 340 and 350 may support WLAN standardized in IEEE 802.11.

Each of the first base station 310, an UE (not-depicted) connected to the first base station 310, the second base station 320, an UE (not-depicted) connected to the second base station 320, the third base station 330, and an UE (not-depicted) connected to the third base station 330 may transmit and receive signals through a CA using the licensed band (F1) and the unlicensed band (F3).

Figure 4:
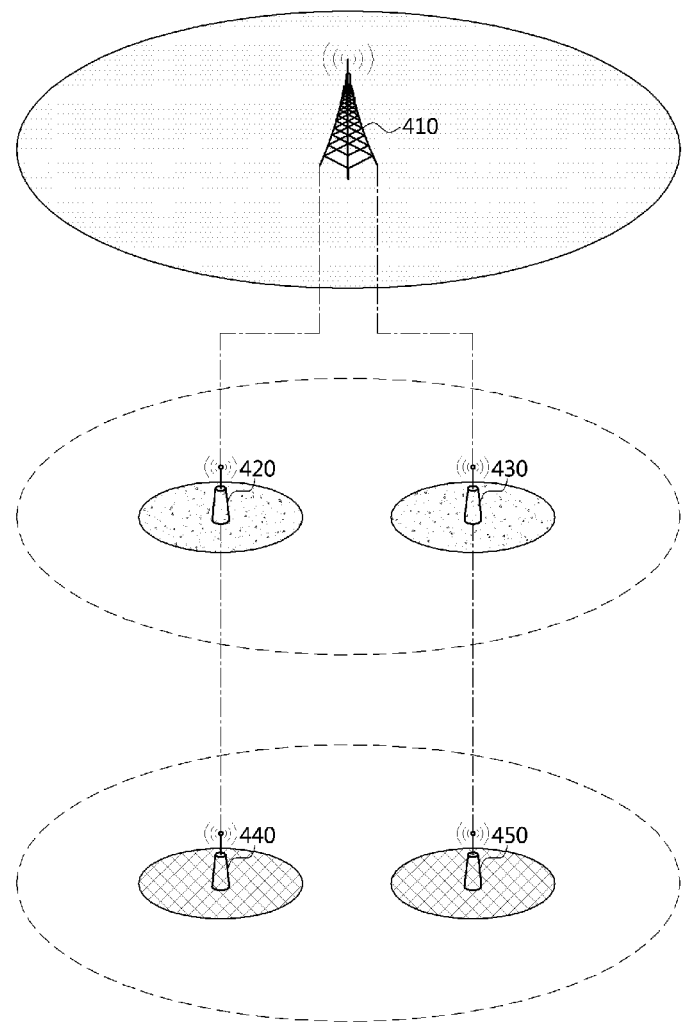
FIG. 4 is a conceptual diagram illustrating a fourth embodiment of a wireless communication network.

FIG. 4 is a conceptual diagram illustrating a fourth embodiment of a wireless communication network.

Referring to FIG. 4, each of a first base station 410, a second base station 420, and a third base station 430 may support cellular communications (e.g., LTE, LTE-A, LAA, etc.). Each of the first base station 410, the second base station 420, and the third base station 430 may support MIMO (e.g., SU-MIMO, MU-MIMO, massive MIMO, etc.), CoMP, CA, etc. The first base station 410 may operate in the licensed band (F1), and form a macro cell. The first base station 410 may be connected to other base stations (e.g., the second base station 420, the third base station 430, etc.) through ideal backhaul links or non-ideal backhaul links. The second base station 420 may be located in coverage of the first base station 410. The second base station 420 may operate in the licensed band (F2), and form a small cell. The third base station 430 may be located in coverage of the first base station 410. The third base station 430 may operate in the licensed band (F2), and form a small cell. Each of the second base station 420 and the third base station 430 may operate in the licensed band (F2) different from the licensed band (F1) in which the first base station 410 operates.

The second base station 420 may be connected with a fourth base station 440 through an ideal backhaul link or a non-ideal backhaul link. The fourth base station 440 may be located in coverage of the second base station 420. The fourth base station 440 may operate in the unlicensed band (F3), and form a small call. The third base station 430 may be connected with a fifth base station 450 through an ideal backhaul link or a non-ideal backhaul link. The fifth base station 450 may be located in coverage of the third base station 430. The fifth base station 450 may operate in the unlicensed band (F3), and form a small cell. Each of the base stations 440 and 450 may support WLAN standardized in IEEE 802.11.

Each of the first base station 410 and an UE (not-depicted) connected to the first base station 410 may transmit and receive signals through a CA using the licensed band (F1) and the unlicensed band (F3). Each of the second base station 420, an UE (not-depicted) connected to the second base station 420, the third base station 430, and an UE (not-depicted) connected to the third base station 430 may transmit and receive signals through a CA using the licensed band (F2) and the unlicensed band (F3).

The above-described communication nodes constituting a wireless communication network (e.g., a base station, an UE, etc.) may transmit signals according to a Listen-Before-Talk (LBT) procedure in the unlicensed band. That is, the communication node may determine whether the unlicensed band is occupied or not by performing an energy detection operation. The communication node may transmit a signal when the unlicensed band is determined as idle state. In this case, the communication node may transmit a signal when the unlicensed band is maintained as idle state during a contention window according to a random backoff operation. On the contrary, when the unlicensed band is determined as a busy state, the communication node may not transmit a signal.

Alternatively, the communication node may transmit a signal based on a Carrier Sensing Adaptive Transmission (CSAT) operation. That is, the communication node may transmit a signal based on a pre-configured duty cycle. The communication node may transmit a signal when a current duty cycle is a duty cycle assigned for communication nodes supporting cellular communications. On the contrary, the communication node may not transmit a signal when a current duty cycle is a duty cycle assigned for communication nodes supporting other communications (e.g., WALN, etc.) except cellular communications. The duty cycle may be determined adaptively based on the number of communication nodes supporting WLAN in the unlicensed band, a usage state of the unlicensed band, etc.

The communication node may perform discontinuous transmission in the unlicensed band. For example, if a maximum transmission duration or a maximum channel occupancy time (max COT) is configured for the unlicensed band, the communication node may transmit signals during the maximum transmission duration or the maxim channel occupancy time. In a case that the communication node cannot transmit whole signals during the current maximum transmission duration (or, maximum channel occupancy time), the communication node may transmit the rest of signals in a next maximum transmission duration (or, next maximum channel occupancy time). Also, the communication node may select a carrier having relatively smaller interferences among unlicensed bands, and operate in the selected carrier. Also, in the case that the communication node transmits signals in the unlicensed band, transmission power may be controlled in order to reduce interferences to other communication nodes.

Meanwhile, the communication node may support communication protocols based on code division multiple access (CDMA), wideband CDMA (WCDMA), time division multiple access (TDMA), frequency division multiple access (FDMA), single carrier FDMA (SC-FDMA), orthogonal frequency division multiplexing (OFDM), or orthogonal frequency division multiple access (OFDMA).

A base station among communication nodes may be referred to as a Node-B (NB), an evolved Node-B (eNB), a base transceiver station (BTS), a radio base station, a radio transceiver, an access point (AP), or an access node. Also, a user equipment (UE) among communication nodes may be referred to as a terminal, an access terminal, a mobile terminal, a station, a subscriber station, a portable subscriber station, a mobile station, a node, or a device. The communication node may have a structure which will be described below.

Figure 5:
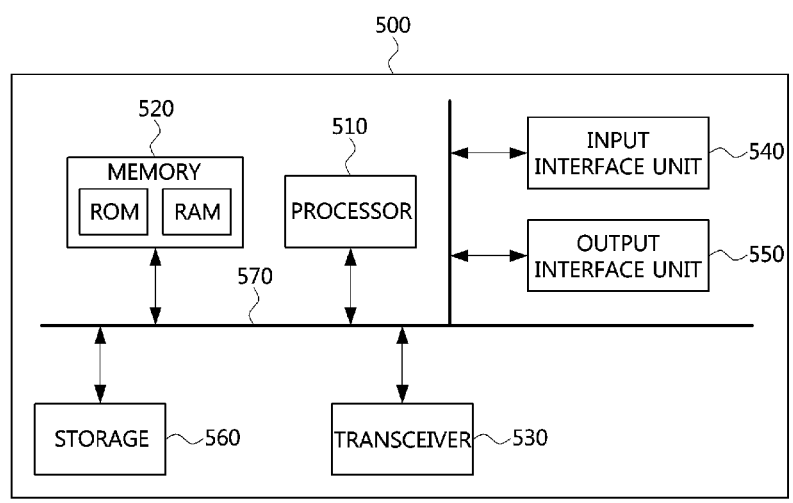
FIG. 5 is a block diagram illustrating an embodiment of a communication node constituting a wireless communication network.

FIG. 5 is a block diagram illustrating an embodiment of a communication node constituting a wireless communication network.

Referring to FIG. 5, a communication node 500 may include at least one processor 510, a memory 520 and a transceiver 530 connected to a network and performing communication. Further, the communication node 500 may include an input interface unit 540, an output interface unit 550, and a storage 560. The respective components included in the communication node 500 may be connected via a bus 570 to communicate with each other.

The processor 510 may perform a program command stored in the memory 520 and/or the storage 560. The processor 510 may be a central processing unit (CPU), a graphics processing unit (GPU) or a dedicated processor in which the methods according to embodiments of the present disclosure are performed. The memory 520 and the storage 560 may include a volatile storage medium and/or a non-volatile storage medium. For example, the memory 520 may include a read only memory (ROM) and/or a random access memory (RAM).

Operation methods of the communication node in the wireless communication network will be described below. Although a method (e.g., signal transmission or reception) performed by a first communication node will be described, a second communication node corresponding thereto may perform a method (e.g., signal reception or transmission) corresponding to the method performed by the first communication node. That is, when an operation of the UE is described, the base station corresponding thereto may perform an operation corresponding to the operation of the UE. On the contrary, when an operation of the base station is described, the UE may perform an operation corresponding to an operation of the base station.

Meanwhile, the carrier aggregation may be applied to at least one of unlicensed band cells and at least one of licensed band cells. Configuration, addition, modification, or release of the unlicensed band cell may be performed through a radio resource control (RRC) signaling (e.g., transmission and reception of "RRCConnectionReconfiguration" messages (hereinafter, referred to as a "RRC message")). The RRC message may be transmitted to a UE through the licensed band cell, and may include information required for management and operation of the unlicensed band cell.

Meanwhile, the cellular communication network (e.g., LTE network) may support frequency division duplexing (FDD) or time division duplexing (TDD). A frame based on FDD may be defined as a type 1 frame, and a frame based on TDD may be defined as a type 2 frame.

Figure 6:
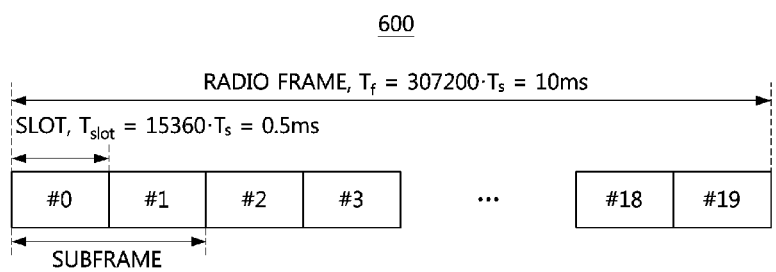
FIG. 6 is a conceptual diagram illustrating an embodiment of a type 1 frame.

FIG. 6 is a conceptual diagram illustrating an embodiment of a type 1 frame.

Referring to FIG. 6, a radio frame 600 may comprise 10 subframes, and each subframe may comprise two slots. Thus, the radio frame 600 may comprise 20 slots (e.g., slot#0, slot#1, slot#2, slot#3, . . . , slot#18, slot#19). The length ($T_f$) of the radio frame 600 may be 10 milliseconds (ms). Also, the length of each subframe may be 1 ms. Also, the length ($T_{slot}$) of each slot may be 0.5 ms. Here, $T_s$ may be 1/30,720,000 second.

Each slot may comprise a plurality of OFDM symbols in time domain, and comprise a plurality of resource blocks (RBs) in frequency domain. Each resource block may comprise a plurality of subcarriers in frequency domain. The number of OFDM symbols constituting each slot may be determined according to configuration of a cyclic prefix (CP). The CP may be classified into a normal CP and an extended CP. If the normal CP is used, each slot may comprise 7 OFDM symbols, and each subframe may comprise 14 OFDM symbols. If the extended CP is used, each slot may comprise 6 OFDM symbols, and each subframe may comprise 12 OFDM symbols.

Figure 7:
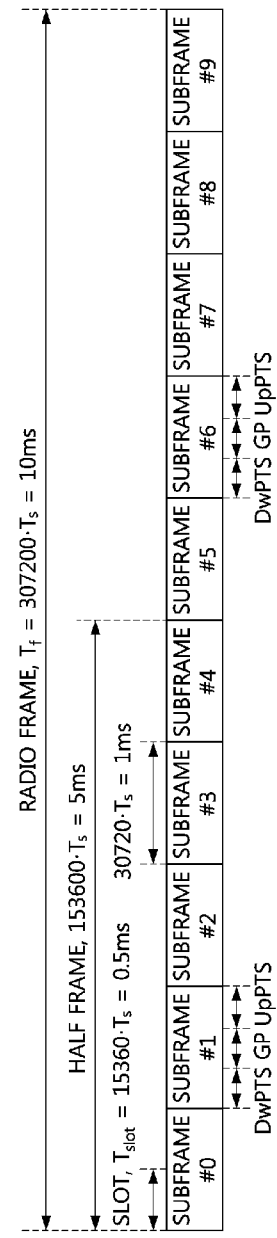
FIG. 7 is a conceptual diagram illustrating an embodiment of a type 2 frame.

FIG. 7 is a conceptual diagram illustrating an embodiment of a type 2 frame.

Referring to FIG. 7, a radio frame 700 may comprise two half frames, and each half frame may comprise 5 subframes. Thus, the radio frame 700 may comprise 10 subframes. The length ($T_f$) of the radio frame 700 may be 10 ms, and the length of each half frame may be 5 ms. The length of each subframe may be 1 ms. Here, $T_s$ may be 1/30,720,000 second.

The radio frame 700 may include at least one downlink subframe, at least one uplink subframe, and at least one special subframe. Each of the downlink subframe and the uplink subframe may comprise two slots. The length ($T_{slot}$) of each slot may be 0.5 ms. Each of subframe#1 and subframe#6, among subframes constituting the radio frame 700, may be a special subframe. Each special subframe may include a downlink pilot time slot (DwPTS), a guard period (GP), and an uplink pilot time slot (UpPTS).

The DwPTS may be regarded as included in downlink duration, and used for cell search, and time and frequency synchronization acquisition of an UE. The GP may be used for resolving interference to uplink data transmission which may occur due to delay of downlink data reception. Also, the GP may include a time required for switching between downlink data reception operation to uplink data transmission operation. The UpPTS may be used for uplink channel estimation, and time and frequency synchronization acquisition of an UE, etc.

The lengths of the DwPTS, GP, and UpPTS included in the special subframe may be controlled variably as needed. Also, the numbers and positions of the downlink subframes, uplink subframes, and special subframes, included in the radio frame 700, may vary as needed.

Figure 8:
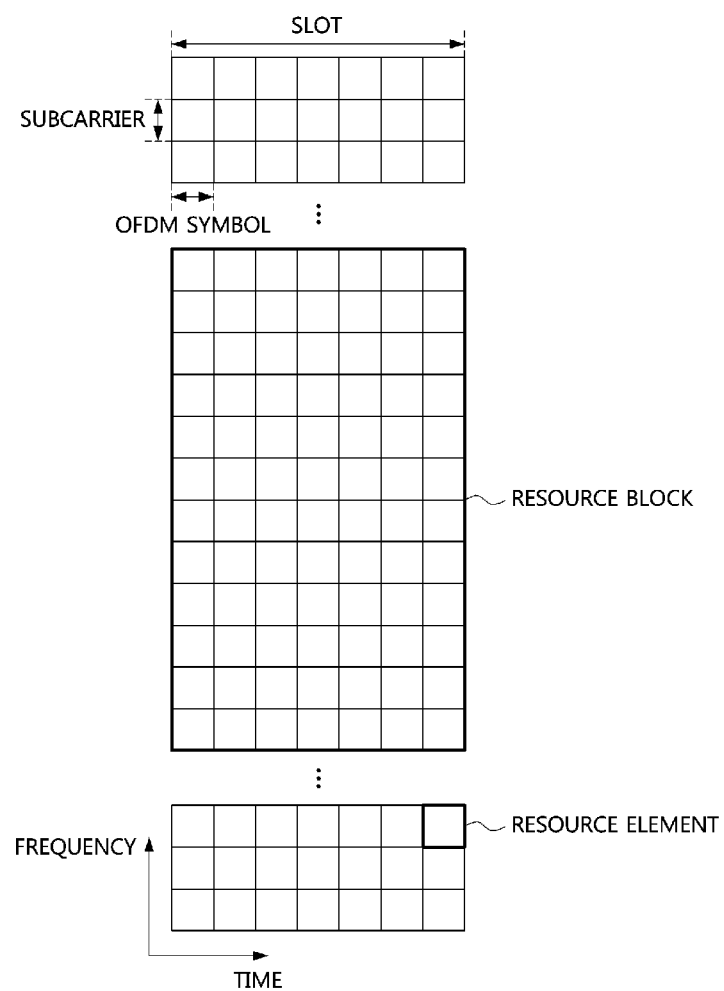
FIG. 8 is a conceptual diagram illustrating an embodiment of a resource grid of a slot included in a subframe.

FIG. 8 is a conceptual diagram illustrating an embodiment of a resource grid of a slot included in a subframe.

Referring to FIG. 8, when the normal CP is used, each resource block (RB) of a slot included in a downlink subframe or an uplink subframe may comprise 7 OFDM symbols in time domain, and 12 subcarriers in frequency domain. In this case, a resource defined by a single OFDM symbol in time domain and a single subcarrier in frequency domain may be referred to as a resource element (RE).

In downlink transmission of a cellular communication network (e.g., LTE network), allocation of resources for an UE may be performed in unit of RBs, and mapping of reference signals and synchronization signals may be performed in unit of REs.

Meanwhile, a downlink subframe may comprise two slots, and each slot may comprise 6 or 7 OFDM symbols. The OFDM symbols included in a slot may be referred to as, sequentially, OFDM symbol#0, OFDM symbol#1, OFDM symbol#2, OFDM symbol#3, 01-DM symbol#4, OFDM symbol#5, and OFDM symbol #6. The OFDM symbol#0 to OFDM symbol#2 (or, OFDM symbol#0 to OFDM symbol#3) included in a first slot of a subframe may comprise control channels. The control channel may include a physical control format indicator channel (PCFICH), a physical hybrid-automatic repeat request (HARQ) indicator channel (PHICH), a physical downlink control channel (PDCCH), etc.

The OFDM symbols to which the control channel is not allocated, among the OFDM symbols constituting each subframe, may include a data channel (e.g., a physical downlink shared channel (PDSCH), etc). Also, an enhanced PDCCH (EPDCCH) may be allocated to a part of RBs (or, REs) constituting the data channel.

The PCFICH including information indicating the number of OFDM symbols used for transmitting the control channel may be configured in the OFDM symbol#0. The PHICH including a HARQ acknowledgment (ACK) or negative-ACK (NACK) which is a response to uplink transmission may be configured in the OFDM symbol used for transmitting the control channel. Downlink control information (DCI) may be transmitted through at least one of PDCCH and EPDCCH. Also, the DCI may include at least one of resource allocation information and resource control information for an UE or a specific group of UEs. For example, the DCI may include downlink scheduling information, uplink scheduling information, uplink transmit power control command, etc. Here, the specific group of UEs may include at least one UE.

The DCI may have a various format according to type, number, and size (e.g., the number of bits constituting information fields) of information fields. The DCI format 0, 3, 3A, 4, etc. may be used for uplink, and the DCI format 1, 1A, 1B, 1C, 1D, 2, 2A, 2B, 2C, etc. may be used for downlink. Information included in the DCI may vary according to the format of the DCI. For example, at least one of a carrier indicator field (CIF), resource block allocation information, modulation and coding scheme (MCS) information, redundancy version (RV) information, new data indicator (NDI) information, transmit power control (TPC) information, HARQ process number information, precoding matrix indicator (PMI) information (or, PMI confirmation information), hopping flag information, flag field information, etc. may be selectively included in the DCI according to the format of the DCI. Thus, the size of control information may vary according to the format of DCI. Also, the same DCI format may be used for transmitting two or more types of control information. In this case, control information may be classified according to the flag field included in the DCI. Control information included in the DCI, according to respective DCI formats, may be explained as the following table 1.

TABLE 1

| DCI Format | Information |
| --- | --- |
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g., paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustments |

The PDCCH may be allocated to a set of one or more contiguous control channel elements (CCEs), and the EPDCCH may be allocated to a set of one or more contiguous enhanced CCEs (ECCEs). The CCE or ECCE may be a logical allocation unit, and comprise a plurality of resource element groups (REGs). The size of bits transmitted through the PDCCH (or, EPDCCH) may be determined according to the number of CCEs or ECCEs, coding rate, etc.

Unlike the licensed band, a period during which signals can be transmitted continuously in the unlicensed band may be restricted within the maximum transmission duration (or, maximum occupation duration). Also, in the case that signals are transmitted based on channel occupation status (e.g., the case that signals are transmitted based on LBT), signals are transmitted when transmissions of other communication nodes have completed. When LTE (or, LTE-A) services are provided through the unlicensed band, transmission of a communication node supporting LTE or LTE-A services may have non-periodical, non-continuous, and opportunistic characteristics. According to such the characteristics, signals which are continuously transmitted by the communication node supporting LTE or LTE-A services during a predetermined time in an unlicensed band may be referred to as "unlicensed band burst."

Also, a set of continuous subframes comprising a combination of one or more channels (e.g., PCFICH, PHICH, PDCCH, EPDCCH, PDSCH, physical multicast channel (PMCH), PUCCH, PUSCH, etc.) and signals (e.g., synchronization signals, reference signals, etc.) defined in the licensed band may be transmitted through the unlicensed band. In this case, the transmission of subframes may be referred to as "unlicensed band transmission."

Frames used for transmission in the unlicensed band may be classified into downlink unlicensed band burst frames, uplink unlicensed band burst frames, and downlink/uplink unlicensed band burst frames. The downlink unlicensed band burst frame may include subframes to which the unlicensed band transmission is applied, and further include unlicensed band signals. In the downlink unlicensed band burst frame, the unlicensed band signal may be located before the subframe to which the unlicensed band transmission is applied. The unlicensed band signal may be configured so that timing of the subframe (or, timing of the slot or timing of the OFDM symbol) to which the unlicensed band transmission is applied coincides with timing of a subframe (or, timing of the slot or timing of the OFDM symbol) in the licensed band. Also, the unlicensed band signal may be used for automatic gain control (AGC), synchronization acquisition, channel estimation, etc. required for receiving data transmitted based on the unlicensed band transmission.

The subframe to which the unlicensed band transmission is applied may be configured within the maximum transmission duration (or, maximum occupation duration). That is, the number of subframes to which the unlicensed band transmission is applied may be configured according to the maximum transmission duration (or, maximum occupation duration). Here, the number of subframes to which the unlicensed band transmission is applied may be configured in consideration of the unlicensed band signal. Information on the maximum transmission duration (or, maximum occupation duration) may be informed via RRC signaling. The UE may identify a start point of the unlicensed band burst by detecting the PDCCH (or, EPDCCH) or the unlicensed band signal. The actual occupation time of the unlicensed band burst or the subframe to which the unlicensed band transmission is applied may be identified by using the unlicensed band signal or the PHICH.

Figure 9:
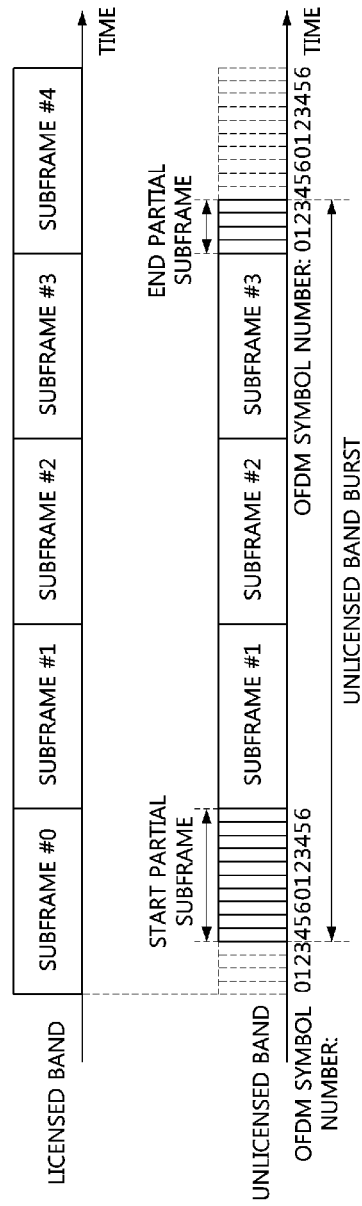
FIG. 9 is a timing diagram illustrating an embodiment of an unlicensed band burst.

FIG. 9 is a timing diagram illustrating an embodiment of an unlicensed band burst.

Referring to FIG. 9, the timing of a subframe (or, slot or OFDM symbol) in the licensed band may be identical to the timing of a subframe (or, slot or OFDM symbol) in the unlicensed band. Here, the licensed band may be referred to as a "licensed band cell" or a "primary cell (PCell)." The unlicensed band may be referred to as an "unlicensed band cell," a "secondary cell (SCell)," or a "LAA cell." In the licensed band, signals can be transmitted continuously. That is, burst transmissions in the licensed band may occur continuously.

On the contrary, burst transmissions in the unlicensed band may occur discontinuously. For example, unlicensed band burst may occur in unit of 4 subframes. A start subframe among subframes constituting the unlicensed band burst may have the length of less than 1 ms. The start subframe having the length of less than 1 ms may be referred to as a "start partial subframe." Also, an end subframe among subframes constituting the unlicensed band burst may have the length of less than 1 ms. The end subframe having the length of less than 1 ms may be referred to as an "end partial subframe." The sum of the lengths of the start partial subframe and the end partial subframe may be configured to be 1 ms. For example, the start partial subframe may comprise the OFDM symbol#4 of a first slot to the OFDM symbol#6 of a second slot. In this case, the end partial subframe may comprise OFDM symbol#0 to OFDM symbol#3 of the first slot.

The start point of the unlicensed band burst (or, the start partial subframe) may be configured within a predetermined set of OFDM symbol numbers. For example, the start point of the unlicensed band burst may be configured as the OFDM symbol#0 of the first slot or the OFDM symbol#0 of the second slot. Alternatively, the start point of the unlicensed band burst in the TDD-based network may be configured to be an OFDM symbol located after a predetermined offset from the OFDM symbol#0 of the first slot. Here, the predetermined offset may be a value corresponding to a time duration of "GP+UpPTS." For example, the start point of the unlicensed band burst in the TDD-based network may be OFDM symbol#0, #2, #3, or #5 of the first slot, or OFDM symbol#1 of the second slot in the subframe.

Alternatively, the start point of the unlicensed band burst may be configured to be a start point or an end point of the PDCCH, or a transmission point of a reference signal (e.g., cell-specific reference signal (CRS), etc.). For example, the start point of the unlicensed band burst may be the OFDM symbol#0 or symbol#4 of the first slot of the subframe. However, the start point of the unlicensed band burst may not be restricted to the above-described examples, and may be configured to be any OFDM symbol of the subframe.

The end point of the unlicensed band burst (or, the end partial subframe) may be configured within a predetermined set of OFDM symbol numbers. For example, the end point of the unlicensed band burst may be the OFDM symbol#0 of the first slot of the subframe, or the OFDM symbol#0 of the second slot of the subframe. Alternatively, the end point of the unlicensed band burst may be configured to be a point after the predetermined number (x) of subframes from the start point of the unlicensed band burst. Here, the x may be a positive integer number. For example, when the start point of the unlicensed band burst is the OFDM symbol#4 of the first slot of the subframe, the end point of the unlicensed band burst may be configured to be an OFDM symbol #3 of a first slot of a subframe located after x subframes from the start point of the unlicensed band burst. The end point of the unlicensed band burst may not be restricted to the above-described examples, and may be configured to be any OFDM symbol in the subframe.

Meanwhile, in order to transmit the unlicensed band burst, a self-scheduling or a cross-carrier scheduling may be used. Also, for transmission of the unlicensed band burst, a semi-persistent scheduling (SPS) may be further used. The transmission of the unlicensed band burst based on the self-scheduling may be performed as explained below.

Figure 10:
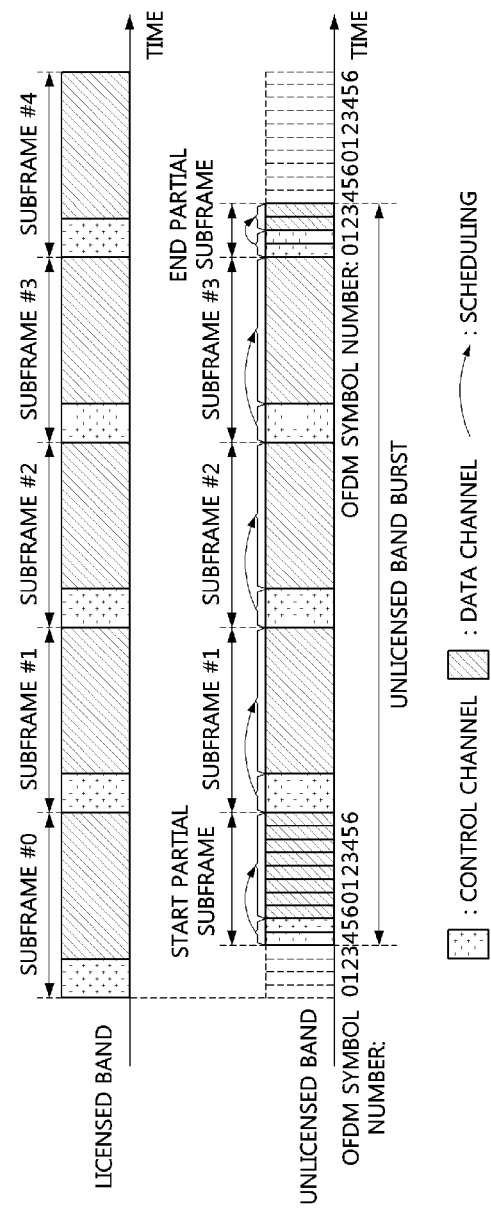
FIG. 10 is a timing diagram illustrating an embodiment of the unlicensed band burst transmission based on self-scheduling.

FIG. 10 is a timing diagram illustrating an embodiment of the unlicensed band burst transmission based on self-scheduling.

Referring to FIG. 10, a base station may transmit signals to an UE through a licensed band or an unlicensed band according to a carrier aggregation (CA). The base station and the UE may support at least one of the licensed band and the unlicensed band. Here, the base station and the UE may constitute one of the wireless communication networks explained by referring to FIGS. 1 to 4. Each of the base station and the UE may have a structure identical to or similar with the structure of the communication node 500 explained by referring to FIG. 5.

In the below description, transmission of an unlicensed band burst, for a case that a timing of a subframe (or, slot or OFDM symbol, etc.) of the licensed band is identical to a timing of a subframe (or, slot or OFDM symbol, etc.) of the unlicensed band, will be explained. Also, the below-explained transmission of the unlicensed band burst may be applied to a case that the timing of the subframe (or, slot or OFDM symbol, etc.) of the licensed band is different from the timing of the subframe (or, slot or OFDM symbol, etc.) of the unlicensed band.

Each of subframes in the licensed band (e.g., subframe#0, subframe#1, subframe#2, subframe#3, subframe#4, etc.) may have a length of 1 ms. Also, the unlicensed band burst may have a length of 4 ms. The unlicensed band burst may comprise a start partial subframe, a subframe#1, a subframe#2, a subframe#3, and an end partial subframe. In the unlicensed band burst, the start partial subframe may have a length of less than 1 ms. For example, the start partial subframe may comprise 10 OFDM symbols. Among the unlicensed band burst, each of the subframe#1, subframe#2, and subframe#3 may have a length of 1 ms. The end partial subframe may have a length of less than 1 ms. For example, the end partial subframe may comprise 4 OFDM symbols.

Each subframe of the licensed band and the unlicensed band may comprise both of control channel and data channel, or only data channel. The control channel may include PDCCH, EPDCCH, PCFICH, PHICH, etc. Here, the EPDCCH may be configured in OFDM symbols used for the data channel in the subframe. The data channel may include PDSCH, etc. The length and configuration of the unlicensed band burst may not be restricted to the above-described example, and may be configured variously.

Scheduling information of PDSCH for respective subframes of the unlicensed band (e.g., the start partial subframe, the subframe#1, the subframe#2, the subframe#3, and the end partial subframe) may be transmitted through PDCCH (or, EPDCCH) of the respective subframes. Here, among the subframes of the unlicensed band, subframes except the partial subframes (e.g., subframe#1, subframe#2, and subframe#3) may be scheduled based on the conventional self-scheduling manner.

In the unlicensed band, a base station may transmit signals as follows.

The base station may transmit scheduling information of PDSCH of the start partial subframe of the unlicensed band to an UE through PDCCH (or, EPDCCH) of the start partial subframe of the unlicensed band. Also, the base station transmit HARQ-related information (e.g., HARQ process number, RV, etc.) for the start partial subframe of the unlicensed band to the UE through PDCCH (or, EPDCCH) of the start subframe of the unlicensed band.

In a case that a PCFICH of the start partial subframe of the unlicensed band is not used in the conventional manner, the base station may transmit to the UE information on the length of the unlicensed band burst through the PCFICH. The length of the unlicensed band burst may be configured in unit of subframes. For example, it may be indicated by the conventional PCFICH whether the control channel is configured with three or four OFDM symbols. Similarly, it may be indicated by the PCFICH whether the length of the unlicensed band burst is configured to be a length corresponding to three or four subframes. The PCFICH used for indicating the length of the unlicensed band burst may be generated in a manner similar with or identical to the conventional PCFICH generation manner. Thus, the UE may identify the length of the unlicensed band burst by detecting the PCFICH in a manner similar with or identical to the conventional PCFICH detection manner. Here, the transmission of the information on the length of the unlicensed band burst through the PCFICH may be omitted.

In a case that PHICH of the start partial subframe of the unlicensed band is not used in the conventional manner, the base station may transmit to the UE at least one of information on the length of the unlicensed band burst, information on the end point of the unlicensed band burst, and information on the number of subframes remaining until the end point of the unlicensed band burst. The length of the unlicensed band burst may be configured in unit of subframes. For example, the length of the unlicensed band burst may be configured to be 4 ms. The information on the end point of the unlicensed band burst may indicate the last OFDM symbol in the end subframe (or, the end partial subframe) constituting the unlicensed band burst. For example, the information on the end point of the unlicensed band burst may indicate the OFDM symbol#3 in the first slot of the subframe#4 in reference to the licensed band. The information on the number of subframes remaining until the end point of the unlicensed band burst may indicate 4. Here, the transmission of the information on the length, information on the end point, and information on the number of subframes remaining until the end point of the unlicensed band burst through PHICH may be omitted.

The base station may transmit data to the UE through PDSCH of the start partial subframe of the unlicensed band indicated by the scheduling information transmitted through PDCCH (or, EPDCCH) of the start partial subframe of the unlicensed band.

The base station may transmit to the UE scheduling information for PDSCH of the subframe#1 of the unlicensed band through PDCCH (or, EPDCCH) of the subframe#1 of the unlicensed band. Also, the base station may transmit to the UE HARQ-related information (e.g., HARQ process number, RV, etc.) for the subframe#1 of the unlicensed band through PDCCH (or, EPDCCH) of the subframe#1 of the unlicensed band.

In a case that PHICH of the subframe#1 of the unlicensed band is not used in the conventional manner, the base station may transmit to the UE at least one of information on the length of the unlicensed band burst, information on the end point of the unlicensed band burst, and information on the number of subframes remaining until the end point of the unlicensed band burst. The length of the unlicensed band burst may be configured to be 4 ms. The information on the end point of the unlicensed band burst may indicate the OFDM symbol#3 of the first slot in the subframe#4 in reference to the licensed band. The information on the number of subframe remaining until the end point of the unlicensed band burst may indicate 3. Here, the transmission of the information on the length of the unlicensed band burst, the end point of the unlicensed band burst, and the number of subframes remaining until the unlicensed band burst, through PHICH, may be omitted.

The base station may transmit data to the UE through PDSCH of the subframe#1 of the unlicensed band indicated by the scheduling information transmitted through PDCCH (or, EPDCCH) of the subframe#1 of the unlicensed band.

The base station may transmit to the UE scheduling information for PDSCH of the subframe#2 of the unlicensed band through PDCCH (or, EPDCCH) of the subframe#2 of the unlicensed band. Also, the base station may transmit to the UE HARQ-related information (e.g., HARQ process number, RV, etc.) for the subframe#2 of the unlicensed band through PDCCH (or, EPDCCH) of the subframe#2 of the unlicensed band.

In a case that PHICH of the subframe#2 of the unlicensed band is not used in the conventional manner, the base station may transmit to the UE at least one of information on the length of the unlicensed band burst, information on the end point of the unlicensed band burst, and information on the number of subframes remaining until the end point of the unlicensed band burst. The length of the unlicensed band burst may be configured to be 4 ms. The information on the end point of the unlicensed band burst may indicate the OFDM symbol#3 of the first slot in the subframe#4 in reference to the licensed band. The information on the number of subframe remaining until the end point of the unlicensed band burst may indicate 2. Here, the transmission of the information on the length of the unlicensed band burst, the end point of the unlicensed band burst, and the number of subframes remaining until the unlicensed band burst, through the PHICH, may be omitted.

The base station may transmit data to the UE through PDSCH of the subframe#2 of the unlicensed band indicated by the scheduling information transmitted through PDCCH (or, EPDCCH) of the subframe#2 of the unlicensed band.

The base station may transmit to the UE scheduling information for PDSCH of the subframe#3 of the unlicensed band through PDCCH (or, EPDCCH) of the subframe#3 of the unlicensed band. Also, the base station may transmit to the UE HARQ-related information (e.g., HARQ process number, RV, etc.) for the subframe#3 of the unlicensed band through PDCCH (or, EPDCCH) of the subframe#3 of the unlicensed band.

In a case that PHICH of the subframe#3 of the unlicensed band is not used in the conventional manner, the base station may transmit to the UE at least one of information on the length of the unlicensed band burst, information on the end point of the unlicensed band burst, and information on the number of subframes remaining until the end point of the unlicensed band burst. The length of the unlicensed band burst may be configured to be 4 ms. The information on the end point of the unlicensed band burst may indicate the OFDM symbol#3 of the first slot in the subframe#4 in reference to the licensed band. The information on the number of subframe remaining until the end point of the unlicensed band burst may indicate 1. Here, the transmission of the information on the length of the unlicensed band burst, the end point of the unlicensed band burst, and the number of subframes remaining until the unlicensed band burst, through the PHICH, may be omitted.

The base station may transmit data to the UE through PDSCH of the subframe#3 of the unlicensed band indicated by the scheduling information transmitted through PDCCH (or, EPDCCH) of the subframe#3 of the unlicensed band.

The base station may transmit to the UE scheduling information for PDSCH of the end partial subframe of the unlicensed band through PDCCH (or, EPDCCH) of the end partial subframe of the unlicensed band. Also, the base station may transmit to the UE HARQ-related information (e.g., HARQ process number, RV, etc.) for the end partial subframe of the unlicensed band through PDCCH (or, EPDCCH) of the end partial subframe of the unlicensed band.

In a case that PCFICH of the end partial subframe of the unlicensed band is not used in the conventional manner, the base station may transmit to the UE information on the end point of the unlicensed band burst through the PCFICH. For example, it may be indicated by the conventional PCFICH whether the control channel is configured with three or four OFDM symbols. Similarly, it may be indicated by the PCFICH whether the end point of the unlicensed band burst is configured to be the third or fourth OFDM symbol of the end partial subframe. The PCFICH used for indicating the end point of the unlicensed band burst may be generated in a manner similar with or identical to the conventional PCFICH generation manner. Thus, the UE may identify the end point of the unlicensed band burst by detecting the PCFICH in a manner similar with or identical to the conventional PCFICH detection manner. Here, the transmission of the information on the end point of the unlicensed band burst through the PCFICH may be omitted.

In a case that PHICH of the end partial subframe of the unlicensed band is not used in the conventional manner, the base station may transmit to the UE at least one of information on the length of the unlicensed band burst, information on the end point of the unlicensed band burst, and information on the number of subframes remaining until the end point of the unlicensed band burst. The length of the unlicensed band burst may be configured to be 4 ms. The information on the end point of the unlicensed band burst may indicate the OFDM symbol#3 of the first slot in the subframe#4 in reference to the licensed band. The information on the number of subframes remaining until the end point of the unlicensed band burst may indicate 0. Here, the transmission of the information on the length of the unlicensed band burst, information on the end point of the unlicensed band burst, and information on the number of subframes remaining until the end point of the unlicensed band burst through PHICH may be omitted.

The base station may transmit data to the UE through PDSCH of the end partial subframe of the unlicensed band indicated by the scheduling information transmitted through PDCCH (or, EPDCCH) of the end partial subframe of the unlicensed band.

The signal transmitted by the base station in the unlicensed band as described above may be received at the UE as follows.

The UE may receive the start partial subframe of the unlicensed band from the base station. For example, the UE may obtain scheduling information for the PDSCH of the start partial subframe of the unlicensed band through PDCCH (or, EPDCCH) of the start partial subframe of the unlicensed band, and obtain data through PDSCH of the start partial subframe of the unlicensed band indicated by the scheduling information. Also, the UE may obtain HARQ-related information for the start partial subframe of the unlicensed band through PDCCH (or, EPDCCH) of the start partial subframe of the unlicensed band. The UE may obtain the information on the length of the unlicensed band burst through PCFICH of the start partial subframe of the unlicensed band. The UE may obtain at least one of the information on the length of the unlicensed band burst, information on the end point of the unlicensed band burst, and the information on the number of subframes remaining until the end point of the unlicensed band burst, through PHICH of the start partial subframe of the unlicensed band burst.

The UE may receive the subframe#1 of the unlicensed band from the base station. For example, the UE may obtain scheduling information for the PDSCH of the subframe#1 of the unlicensed band through PDCCH (or, EPDCCH) of the subframe#1 of the unlicensed band, and obtain data through the PDSCH of the subframe#1 of the unlicensed band indicated by the scheduling information. Also, the UE may obtain HARQ-related information for the subframe#1 of the unlicensed band through PDCCH (or, EPDCCH) of the subframe#1 of the unlicensed band. The UE may obtain at least one of the information on the length of the unlicensed band burst, information on the end point of the unlicensed band burst, and the information on the number of subframes remaining until the end point of the unlicensed band burst, through PHICH of the subframe#1 of the unlicensed band.

The UE may receive the subframe#2 of the unlicensed band from the base station. For example, the UE may obtain scheduling information for the PDSCH of the subframe#2 of the unlicensed band through PDCCH (or, EPDCCH) of the subframe#2 of the unlicensed band, and obtain data through the PDSCH of the subframe#2 of the unlicensed band indicated by the scheduling information. Also, the UE may obtain HARQ-related information for the subframe#2 of the unlicensed band through PDCCH (or, EPDCCH) of the subframe#2 of the unlicensed band. The UE may obtain at least one of the information on the length of the unlicensed band burst, information on the end point of the unlicensed band burst, and the information on the number of subframes remaining until the end point of the unlicensed band burst, through PHICH of the subframe#2 of the unlicensed band.

The UE may receive the subframe#3 of the unlicensed band from the base station. For example, the UE may obtain scheduling information for the PDSCH of the subframe#3 of the unlicensed band through PDCCH (or, EPDCCH) of the subframe#3 of the unlicensed band, and obtain data through PDSCH of the subframe#3 of the unlicensed band indicated by the scheduling information. Also, the UE may obtain HARQ-related information for the subframe#3 of the unlicensed band through PDCCH (or, EPDCCH) of the subframe#3 of the unlicensed band. The UE may obtain at least one of the information on the length of the unlicensed band burst, information on the end point of the unlicensed band burst, and the information on the number of subframes remaining until the end point of the unlicensed band burst, through PHICH of the subframe#3 of the unlicensed band.

The UE may receive the end partial subframe of the unlicensed band from the base station. For example, the UE may obtain scheduling information for the PDSCH of the end partial subframe of the unlicensed band through PDCCH (or, EPDCCH) of the end partial subframe of the unlicensed band, and obtain data through PDSCH of the end partial subframe of the unlicensed band indicated by the scheduling information. Also, the UE may obtain HARQ-related information for the end partial subframe of the unlicensed band through PDCCH (or, EPDCCH) of the end partial subframe of the unlicensed band. The UE may obtain the information on the end point of the unlicensed band burst through PCFICH of the end partial subframe of the unlicensed band. The UE may obtain at least one of the information on the length of the unlicensed band burst, information on the end point of the unlicensed band burst, and the information on the number of subframes remaining until the end point of the unlicensed band burst, through PHICH of the end partial subframe of the unlicensed band.

Figure 11:
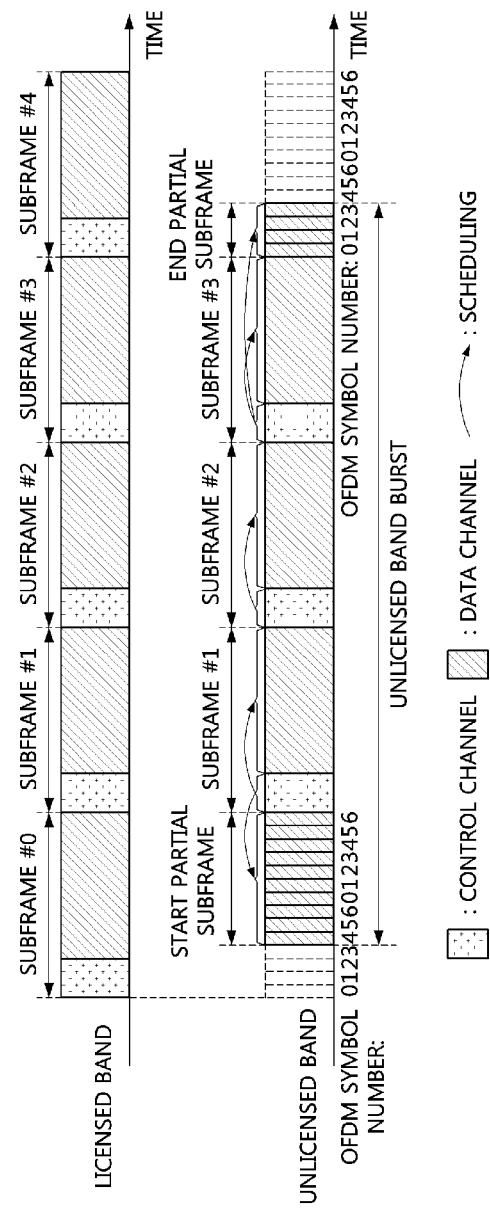
FIG. 11 is a timing diagram illustrating another embodiment for transmission of an unlicensed band burst based on self-scheduling.

FIG. 11 is a timing diagram illustrating another embodiment for transmission of an unlicensed band burst based on self-scheduling.

Referring to FIG. 11, a base station may transmit signals to an UE through a licensed band or an unlicensed band according to a carrier aggregation (CA). The base station and the UE may support at least one of the licensed band and the unlicensed band. Here, the base station and the UE may constitute one of the wireless communication networks explained by referring to FIGS. 1 to 4. Each of the base station and the UE may have a structure identical to or similar with the structure of the communication node 500 explained by referring to FIG. 5.

In the below description, transmission of an unlicensed band burst, for a case that a timing of a subframe (or, slot or OFDM symbol, etc.) of the licensed band is identical to a timing of a subframe (or, slot or OFDM symbol, etc.) of the unlicensed band, will be explained. Also, the below-explained transmission of the unlicensed band burst may be applied to a case that the timing of the subframe (or, slot or OFDM symbol, etc.) of the licensed band is different from the timing of the subframe (or, slot or OFDM symbol, etc.) of the unlicensed band. Here, the structures of the subframe and the unlicensed band burst may be identical to or similar with those of the subframe and the unlicensed band burst which were explained by referring to FIG. 10. Among the subframes of the unlicensed band, subframes (e.g., subframe#1, subframe#2, and subframe#3) except partial subframes may be scheduled based on the conventional self-scheduling method.

In the unlicensed band, a base station may transmit signals as follows.

A start partial subframe of the unlicensed band may comprise only data channel (e.g., PDSCH), and the base station may transmit data to an UE through PDSCH of the start partial subframe of the unlicensed band. For example, in a case that the start partial subframe of the unlicensed band is scheduled by the subframe#1 of the unlicensed band, a control channel may be omitted in the start partial subframe of the unlicensed band. The base station may transmit to the UE scheduling information for PDSCH of the subframe#1 of the unlicensed band through PDCCH (or, EPDCCH) of the subframe#1 of the unlicensed band. Alternatively, the base station may transmit to the UE respective scheduling information for PDSCHs of the start partial subframe and the subframe#1 of the unlicensed band through PDCCH (or, EPDCCH) of the subframe#1 of the unlicensed band.

In a case that only scheduling information for PDSCH of the subframe#1 of the unlicensed band is transmitted through PDCCH (or, EPDCCH) of the subframe#1 of the unlicensed band, PDSCH of the start partial subframe of the unlicensed band may be scheduled based on the scheduling information for the PDSCH of the subframe#1 of the unlicensed band. In the case that respective scheduling information for the PDSCHs of the start partial subframe and the subframe#1 of the unlicensed band are transmitted through PDCCH (or, EPDCCH) of the subframe#1 of the unlicensed band, the PDSCH of the start partial subframe of the unlicensed band may be scheduled based on the scheduling information for the PDSCH of the start partial subframe of the unlicensed band.

Also, the base station may transmit to the UE the HARQ-related information for the subframe#1 of the unlicensed band through PDCCH (or, EPDCCH) of the subframe#1 of the unlicensed band. Alternatively, respective HARQ-related information for the start partial subframe and the subframe#1 of the unlicensed band may be transmitted to the UE through PDCCH (or, EPDCCH) of the subframe#1 of the unlicensed band.

Meanwhile, resource block allocation related information (e.g., resource allocation header, resource block allocation for a type 0 resource allocation (RA), subset, shift, resource block allocation for a type 1 RA, etc.), MCS information, TPC for PUCCH, etc. may be transmitted through a DCI corresponding to format 1. A DCI (e.g., DCI with format 1) transmitted through PDCCH (or, EPDCCH) of the subframe#1 of the unlicensed band may be used for the start partial subframe of the unlicensed band.

For example, the DCI may further comprise a field indicating HARQ-related information for the start partial subframe of the unlicensed band. In this case, the additional field may include HARQ-related information for the start partial subframe of the unlicensed band, and HARQ-related information for the start partial subframe of the unlicensed band may be transmitted through the additional field. Alternatively, a new DCI may be defined as including fields indicating respective HARQ-related information for the start partial subframe and the subframe#1 of the unlicensed band. Alternatively, the size of field indicating HARQ-related information may be doubled, and the respective HARQ-related information for the start partial subframe and the subframe#1 of the unlicensed band may be transmitted through the field twice the size of the conventional field.

In the case that the new or changed DCI is used for the transmission of the HARQ-related information for the start partial subframe of the unlicensed band, an indicator informing the UE of that the new or changed DCI is used may be required. Since a HARQ procedure in the unlicensed band is performed asynchronously, PHICH may not be used. In this case, the indicator informing of that the new or changed DCI is used may be transmitted through PHICH. For example, the indicator informing of that the new or changed DCI is used may be transmitted through PHICH of the subframe#1 of the unlicensed band.

In a case that PHICH of the subframe#1 of the unlicensed band is not used for the conventional purpose or informing of that the new or changed DCI is used, the base station may transmit to the UE at least one of information on the length of the unlicensed band burst, information on the end point of the unlicensed band burst, and information on the number of subframes remaining until the end point of the unlicensed band burst through PHICH of the subframe#1. The length of the unlicensed band burst may be configured in unit of subframes. For example, the length of the unlicensed band burst may be configured to be 4 ms. The information on the end point of the unlicensed band burst may indicate the OFDM symbol#3 of the first slot of the subframe#4 in reference to the licensed band. The information on the number of subframes remaining until the end point of the unlicensed band burst may indicate 3. Here, the transmission of the information on the length of the unlicensed band burst, the information on the end point of the unlicensed band burst, and the information on the number of subframes remaining until the end point of the unlicensed band burst through the PHICH may be omitted.

The base station may transmit data to the UE through PDSCH of the subframe#1 of the unlicensed band indicated by the scheduling information transmitted through PDCCH (or, EPDCCH) of the subframe#1 of the unlicensed band.

The base station may transmit to the UE scheduling information for PDSCH of the subframe#2 of the unlicensed band through PDCCH (or, EPDCCH) of the subframe#2 of the unlicensed band. Also, the base station may transmit to the UE HARQ-related information (e.g., HARQ process number, RV, etc.) for the subframe#2 of the unlicensed band through PDCCH (or, EPDCCH) of the subframe#2 of the unlicensed band.

In a case that a PHICH of the subframe#2 of the unlicensed band is not used for the conventional purpose, the base station may transmit to the UE at least one of information on the length of the unlicensed band burst, information on the end point of the unlicensed band burst, and information on the number of subframes remaining until the end point of the unlicensed band burst through the PHICH. The length of the unlicensed band burst may be configured to be 4 ms. The information on the end point of the unlicensed band burst may indicate the OFDM symbol#3 of the first slot of the subframe#4 in reference to the licensed band. The information on the number of subframes remaining until the end point of the unlicensed band burst may indicate 2. Here, the transmission of the information on the length of the unlicensed band burst, the information on the end point of the unlicensed band burst, and the information on the number of subframes remaining until the end point of the unlicensed band burst through the PHICH may be omitted.

The base station may transmit data to the UE through PDSCH of the subframe#2 of the unlicensed band indicated by the scheduling information transmitted through PDCCH (or, EPDCCH) of the subframe#2 of the unlicensed band.

The base station may transmit to the UE scheduling information for PDSCH of the subframe#3 of the unlicensed band through PDCCH (or, EPDCCH) of the subframe#3 of the unlicensed band. Alternatively, the base station may transmit to the UE respective scheduling information for the subframe#3 and the end partial subframe of the unlicensed band through PDCCH (or, EPDCCH) of the subframe#3 of the unlicensed band.

Also, the base station may transmit to the UE HARQ-related information for the subframe#3 of the unlicensed band through PDCCH (or, EPDCCH) of the subframe#3 of the unlicensed band. Alternatively, the base station may transmit to the UE respective HARQ-related information for the subframe#3 and the end partial subframe of the unlicensed band through PDCCH (or, EPDCCH) of the subframe#3 of the unlicensed band.

For example, the DCI may further comprise a field indicating HARQ-related information for the end partial subframe of the unlicensed band. In this case, the additional field may include HARQ-related information for the end partial subframe of the unlicensed band, and HARQ-related information for the end partial subframe of the unlicensed band may be transmitted through the additional field. Alternatively, a new DCI may be defined as including fields indicating respective HARQ-related information for the end partial subframe and the subframe#3 of the unlicensed band. Alternatively, the size of field indicating HARQ-related information may be doubled, and the respective HARQ-related information for the end partial subframe and the subframe#3 of the unlicensed band may be transmitted through the field twice the size of the conventional field.

In the case that the new or changed DCI is used for the transmission of the HARQ-related information for the end partial subframe of the unlicensed band, an indicator informing the UE of that the new or changed DCI is used may be required. Since the HARQ procedure in the unlicensed band is performed asynchronously, PHICH may not be used. In this case, the indicator informing of that the new or changed DCI is used may be transmitted through PHICH. For example, the indicator informing of that the new or changed DCI is used may be transmitted through PHICH of the subframe#3 of the unlicensed band.

In a case that PHICH of the subframe#3 of the unlicensed band is not used for the conventional purpose or informing of that the new or changed DCI is used, the base station may transmit to the UE at least one of information on the length of the unlicensed band burst, information on the end point of the unlicensed band burst, and information on the number of subframes remaining until the end point of the unlicensed band burst through PHICH of the subframe#3 of the unlicensed band. The length of the unlicensed band burst may be configured in unit of subframes. For example, the length of the unlicensed band burst may be configured to be 4 ms. The information on the end point of the unlicensed band burst may indicate the OFDM symbol#3 of the first slot of the subframe#4 in reference to the licensed band. The information on the number of subframes remaining until the end point of the unlicensed band burst may indicate 1. Here, the transmission of the information on the length of the unlicensed band burst, the information on the end point of the unlicensed band burst, and the information on the number of subframes remaining until the end point of the unlicensed band burst through PHICH may be omitted.

The base station may transmit data to the UE through PDSCH of the subframe#3 of the unlicensed band indicated by the scheduling information transmitted through PDCCH (or, EPDCCH) of the subframe#3 of the unlicensed band. The base station may transmit data to the UE through PDSCH of the end partial subframe of the unlicensed band indicated by the scheduling information transmitted through PDCCH (or, EPDCCH) of the end partial subframe of the unlicensed band.

Here, in a case that only scheduling information for PDSCH of the subframe#3 of the unlicensed band is transmitted through PDCCH (or, EPDCCH) of the subframe#3 of the unlicensed band, PDSCH of the end partial subframe of the unlicensed band may be scheduled based on the scheduling information for PDSCH of the subframe#3 of the unlicensed band. In the case that respective scheduling information for PDSCHs of the end partial subframe and the subframe#3 of the unlicensed band are transmitted through PDCCH (or, EPDCCH) of the subframe#3 of the unlicensed band, PDSCH of the end partial subframe of the unlicensed band may be scheduled based on the scheduling information for PDSCH of the end partial subframe of the unlicensed band. In the case that PDSCH of the end partial subframe is scheduled by the subframe#3 of the unlicensed band, a control channel may be omitted in the end partial subframe of the unlicensed band.

The signal transmitted by the base station in the unlicensed band as described above may be received at the UE as follows.

The UE may receive the start partial subframe of the unlicensed band from the base station, and store the received start partial subframe. The UE may receive the subframe#1 of the unlicensed band from the base station. For example, the UE may obtain scheduling information for PDSCH of the subframe#1 of the unlicensed band through PDCCH (or, EPDCCH) of the subframe#1 of the unlicensed band. Alternatively, the UE may obtain respective scheduling information for the start partial subframe and the subframe#1 of the unlicensed band through PDCCH (or, EPDCCH) of the subframe#1 of the unlicensed band.

In a case that only scheduling information for PDSCH of the subframe#1 of the unlicensed band is obtained, the UE may obtain data from the start partial subframe of the unlicensed band based on the scheduling information for PDSCH of the subframe#1 of the unlicensed band. Alternatively, in a case that respective scheduling information for the start partial subframe and the subframe#1 of the unlicensed band are obtained, the UE may obtain data from the start partial subframe based on the scheduling information for PDSCH of the start partial subframe of the unlicensed band.

The UE may obtain HARQ-related information for the subframe#1 of the unlicensed band through PDCCH (or, EPDCCH) of the subframe#1 of the unlicensed band. Alternatively, the UE may obtain respective HARQ-related information for the start partial subframe and the subframe#1 of the unlicensed band through PDCCH (or, EPDCCH) of the subframe#1 of the unlicensed band. The UE may obtain an indicator informing of that the new or changed DCI is used through PHICH of the subframe#1 of the unlicensed band. Alternatively, the UE may obtain at least one of information on the length of the unlicensed band burst, information on the end point of the unlicensed band burst, and information on the number of subframes remaining until the end point of the unlicensed band burst, through PHICH of the subframe#1 of the unlicensed band.

The UE may receive data through PDSCH of the subframe#1 of the unlicensed band indicated by the scheduling information received through PDCCH (or, EPDCCH) of the subframe#1 of the unlicensed band.

The UE may receive the subframe#2 of the unlicensed band from the base station. For example, the UE may obtain scheduling information for PDSCH of the subframe#2 of the unlicensed band through PDCCH (or, EPDCCH) of the subframe#2 of the unlicensed band, and obtain data through PDSCH of the subframe#2 of the unlicensed band indicated by the scheduling information. Also, the UE may obtain HARQ-related information for the subframe#2 of the unlicensed band through PDCCH (or, EPDCCH) of the subframe#2 of the unlicensed band. The UE may obtain at least one of information on the length of the unlicensed band burst, information on the end point of the unlicensed band burst, and information on the number of subframes remaining until the end point of the unlicensed band burst, through PHICH of the subframe#2 of the unlicensed band burst.

The UE may receive the subframe#3 of the unlicensed band from the base station. For example, the UE may obtain scheduling information for PDSCH of the subframe#3 of the unlicensed band through PDCCH (or, an EPDCCH) of the subframe#3 of the unlicensed band. Alternatively, the UE may obtain respective scheduling information for PDSCHs of the subframe#3 and the end partial subframe of the unlicensed band through PDCCH (or, EPDCCH) of the subframe#3 of the unlicensed band. The UE may obtain data through PDSCH of the subframe#3 of the unlicensed band indicated by the scheduling information of the subframe#3 of the unlicensed band.

Also, the UE may obtain HARQ-related information for the subframe#3 of the unlicensed band through PDCCH (or, EPDCCH) of the subframe#3 of the unlicensed band. Alternatively, the UE may obtain respective HARQ-related information for the end partial subframe and the subframe#3 of the unlicensed band through PDCCH (or, EPDCCH) of the subframe#3 of the unlicensed band. The UE may obtain an indicator informing of that the new or changed DCI is used through PHICH of the subframe#3 of the unlicensed band. Alternatively, the UE may obtain at least one of information on the length of the unlicensed band burst, information on the end point of the unlicensed band burst, and information on the number of subframes remaining until the end point of the unlicensed band burst, through PHICH of the subframe#3 of the unlicensed band.

The UE may receive the end partial subframe of the unlicensed band from the base station. In a case that only scheduling information for PDSCH of the subframe#3 of the unlicensed band is obtained, the UE may obtain data from the end partial subframe of the unlicensed band based on the scheduling information for PDSCH of the subframe#3 of the unlicensed band. Alternatively, in a case that respective scheduling information for PDSCHs of the end partial subframe and the subframe#3 of the unlicensed band are obtained, the UE may obtain data from the end partial subframe based on the scheduling information for PDSCH of the end partial subframe of the unlicensed band.

Meanwhile, when the cross-carrier scheduling method is used, transmission of the unlicensed band burst may be performed as follows.

Figure 12:
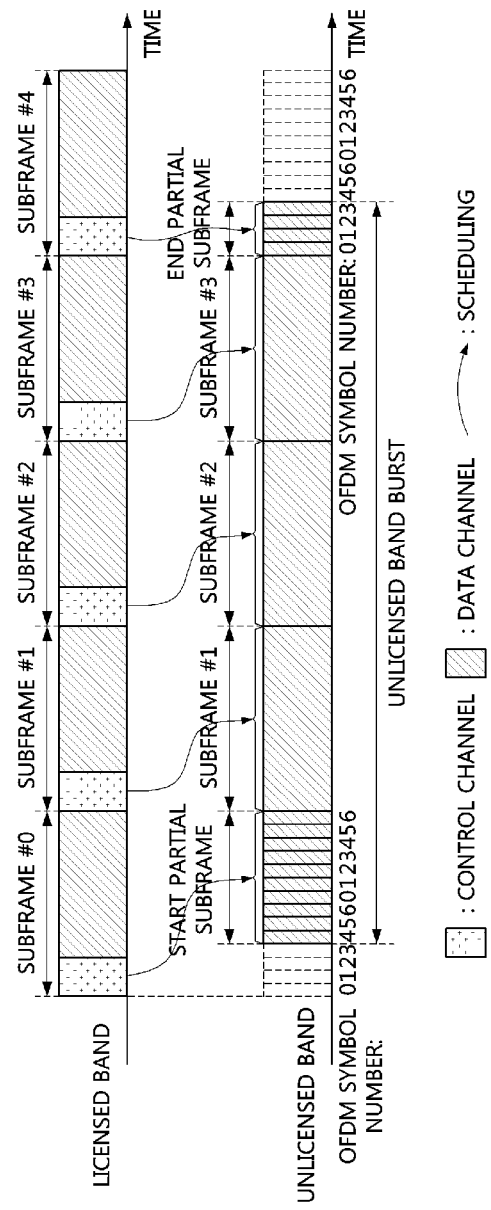
FIG. 12 is a timing diagram illustrating an embodiment of transmission of an unlicensed band burst based on cross-carrier scheduling.

FIG. 12 is a timing diagram illustrating an embodiment of transmission of an unlicensed band burst based on cross-carrier scheduling.

Referring to FIG. 12, a base station may transmit signals to an UE through a licensed band or an unlicensed band according to a carrier aggregation (CA). The base station and the UE may support at least one of the licensed band and the unlicensed band. Here, the base station and the UE may constitute one of the wireless communication networks explained by referring to FIGS. 1 to 4. Each of the base station and the UE may have a structure identical to or similar with the structure of the communication node 500 explained by referring to FIG. 5.

In the below description, transmission of an unlicensed band burst, for a case that a timing of a subframe (or, slot or OFDM symbol, etc.) of the licensed band is identical to a timing of a subframe (or, slot or OFDM symbol, etc.) of the unlicensed band, will be explained. Also, the below-explained transmission of the unlicensed band burst may be applied to a case that the timing of the subframe (or, slot or OFDM symbol, etc.) of the licensed band is different from the timing of the subframe (or, slot or OFDM symbol, etc.) of the unlicensed band. Here, the structures of the subframe and the unlicensed band burst may be identical to or similar with those of the subframe and the unlicensed band burst which were explained by referring to FIG. 10. Among the subframes of the unlicensed band, subframes (e.g., subframe#1, subframe#2, and subframe#3) except partial subframes may be scheduled based on the conventional self-scheduling method.

In the unlicensed band, the base station may transmit signals as follows.

The base station may transmit data to the UE through respective data channels (e.g., PDSCH) of a start partial subframe, a subframe#1, a subframe#2, a subframe#3, and an end partial subframe of the unlicensed band. Each of the start partial subframe, subframe#1, subframe#2, subframe#3, and end partial subframe of the unlicensed band may comprise both of control channel and data channel, or only data channel.

Scheduling information for a data channel of the start partial subframe of the unlicensed band may be transmitted through PDCCH (or, EPDCCH) of the subframe#0 of the licensed band. In this case, the base station may transmit data to the UE through PDSCH of the start partial subframe of the unlicensed band indicated by the scheduling information transmitted through PDCCH (or, EPDCCH) of the subframe#0 of the licensed band. Also, HARQ-related information for the start partial subframe of the unlicensed band, information on the length of the unlicensed band burst, information on the end point of the unlicensed band burst, information on the number of subframes remaining until the end point of the unlicensed band burst may be transmitted through at least one control channel (e.g., PDCCH, EPDCCH, PHICH, PCFICH, etc.) of the subframe#0 of the licensed band.

Meanwhile, in a case that a start point of PDSCH included in the start partial subframe of the unlicensed band is located after an end point of the PDCCH included in the subframe#0 of the licensed band, scheduling information for the PDSCH of the start partial subframe may be transmitted through EPDCCH of the subframe#0 of the licensed band instead of PDCCH. Also, HARQ-related information for the start partial subframe of the unlicensed band, information on the length of the unlicensed band burst, information on the end point of the unlicensed band burst, information on the number of subframes remaining until the end point of the unlicensed band burst may be transmitted through EPDCCH of the subframe#0 of the licensed band instead of PDCCH.

Since the start point of the EPDCCH may be configured variably by an upper layer, EPDCCH of the licensed band may be configured by considering the start point of the start partial subframe of the unlicensed band. Also, EPDCCH used for scheduling the start partial subframe may be configured beforehand in the licensed band. The start point of the start partial subframe of the unlicensed band may be identical to the start point of EPDCCH used for scheduling the start partial subframe of the unlicensed band.

Scheduling information for PDSCH of the subframe#1 of the unlicensed band may be transmitted through PDCCH (or, EPDCCH) of the subframe#1 of the licensed band. In this case, the base station may transmit data to the UE through PDSCH of the subframe#1 of the unlicensed band indicated by the scheduling information transmitted through PDCCH (or, EPDCCH) of the subframe#1 of the licensed band. Also, HARQ-related information for the subframe#1 of the unlicensed band, information on the length of the unlicensed band burst, information on the end point of the unlicensed band burst, information on the number of subframes remaining until the end point of the unlicensed band burst, etc. may be transmitted through at least one control channel (e.g., PDCCH, EPDCCH, PHICH, PCFICH, etc.) of the subframe#1 of the licensed band.

Scheduling information for PDSCH of the subframe#2 of the unlicensed band may be transmitted through PDCCH (or, EPDCCH) of the subframe#2 of the licensed band. In this case, the base station may transmit data to the UE through PDSCH of the subframe#2 of the unlicensed band indicated by the scheduling information transmitted through PDCCH (or, EPDCCH) of the subframe#2 of the licensed band. Also, HARQ-related information for the subframe#2 of the unlicensed band, information on the length of the unlicensed band burst, information on the end point of the unlicensed band burst, information on the number of subframes remaining until the end point of the unlicensed band burst, etc. may be transmitted through at least one control channel (e.g., PDCCH, EPDCCH, PHICH, PCFICH, etc.) of the subframe#2 of the licensed band.

Scheduling information for PDSCH of the subframe#3 of the unlicensed band may be transmitted through PDCCH (or, EPDCCH) of the subframe#3 of the licensed band. In this case, the base station may transmit data to the UE through the PDSCH of the subframe#3 of the unlicensed band indicated by the scheduling information transmitted through PDCCH (or, EPDCCH) of the subframe#3 of the licensed band. Also, HARQ-related information for the subframe#3 of the unlicensed band, information on the length of the unlicensed band burst, information on the end point of the unlicensed band burst, information on the number of subframes remaining until the end point of the unlicensed band burst, etc. may be transmitted through at least one control channel (e.g., PDCCH, EPDCCH, PHICH, PCFICH, etc.) of the subframe#3 of the licensed band.

Scheduling information for PDSCH of the end partial subframe of the unlicensed band may be transmitted through PDCCH (or, EPDCCH) of the subframe#4 of the licensed band. In this case, the base station may transmit data to the UE through PDSCH of the end partial subframe of the unlicensed band indicated by the scheduling information transmitted through PDCCH (or, EPDCCH) of the subframe#4 of the licensed band. Also, HARQ-related information for the end partial subframe of the unlicensed band, information on the length of the unlicensed band burst, information on the end point of the unlicensed band burst, information on the number of subframes remaining until the end point of the unlicensed band burst, etc. may be transmitted through at least one control channel (e.g., PDCCH, EPDCCH, PHICH, PCFICH, etc.) of the subframe#4 of the licensed band.

The signal transmitted by the base station in the unlicensed band as described above may be received at the UE as follows.

The UE may receive the start partial subframe of the unlicensed band. For example, the UE may obtain data through PDSCH of the start partial subframe of the unlicensed band indicated by the scheduling information received through PDCCH (or, EPDCCH) of the subframe#0 of the licensed band. HARQ-related information for the start partial subframe of the unlicensed band, information on the length of the unlicensed band burst, information on the end point of the unlicensed band burst, information on the number of subframes remaining until the end point of the unlicensed band burst, etc. may be obtained through at least one control channel (e.g., PDCCH, EPDCCH, PHICH, PCFICH, etc.) of the subframe#0 of the licensed band.

The UE may receive the subframe#1 of the unlicensed band. For example, the UE may obtain data through PDSCH of the subframe#1 of the unlicensed band indicated by the scheduling information received through PDCCH (or, EPDCCH) of the subframe#1 of the licensed band. HARQ-related information for the subframe#1 of the unlicensed band, information on the length of the unlicensed band burst, information on the end point of the unlicensed band burst, information on the number of subframes remaining until the end point of the unlicensed band burst, etc. may be obtained through at least one control channel (e.g., PDCCH, EPDCCH, PHICH, PCFICH, etc.) of the subframe#1 of the licensed band.

The UE may receive the subframe#2 of the unlicensed band. For example, the UE may obtain data through PDSCH of the subframe#2 of the unlicensed band indicated by the scheduling information received through PDCCH (or, EPDCCH) of the subframe#2 of the licensed band. HARQ-related information for the subframe#2 of the unlicensed band, information on the length of the unlicensed band burst, information on the end point of the unlicensed band burst, information on the number of subframes remaining until the end point of the unlicensed band burst, etc. may be obtained through at least one control channel (e.g., PDCCH, EPDCCH, PHICH, PCFICH, etc.) of the subframe#2 of the licensed band.

The UE may receive the subframe#3 of the unlicensed band. For example, the UE may obtain data through PDSCH of the subframe#3 of the unlicensed band indicated by the scheduling information received through PDCCH (or, EPDCCH) of the subframe#3 of the licensed band. HARQ-related information for the subframe#3 of the unlicensed band, information on the length of the unlicensed band burst, information on the end point of the unlicensed band burst, information on the number of subframes remaining until the end point of the unlicensed band burst, etc. may be obtained through at least one control channel (e.g., PDCCH, EPDCCH, PHICH, PCFICH, etc.) of the subframe#3 of the licensed band.

The UE may receive the end partial subframe of the unlicensed band. For example, the UE may obtain data through PDSCH of the end partial subframe of the unlicensed band indicated by the scheduling information received through the PDCCH (or, EPDCCH) of the subframe#4 of the licensed band. HARQ-related information for the end partial subframe of the unlicensed band, information on the length of the unlicensed band burst, information on the end point of the unlicensed band burst, information on the number of subframes remaining until the end point of the unlicensed band burst, etc. may be obtained through at least one control channel (e.g., PDCCH, EPDCCH, PHICH, PCFICH, etc.) of the subframe#4 of the licensed band.

Figure 13:
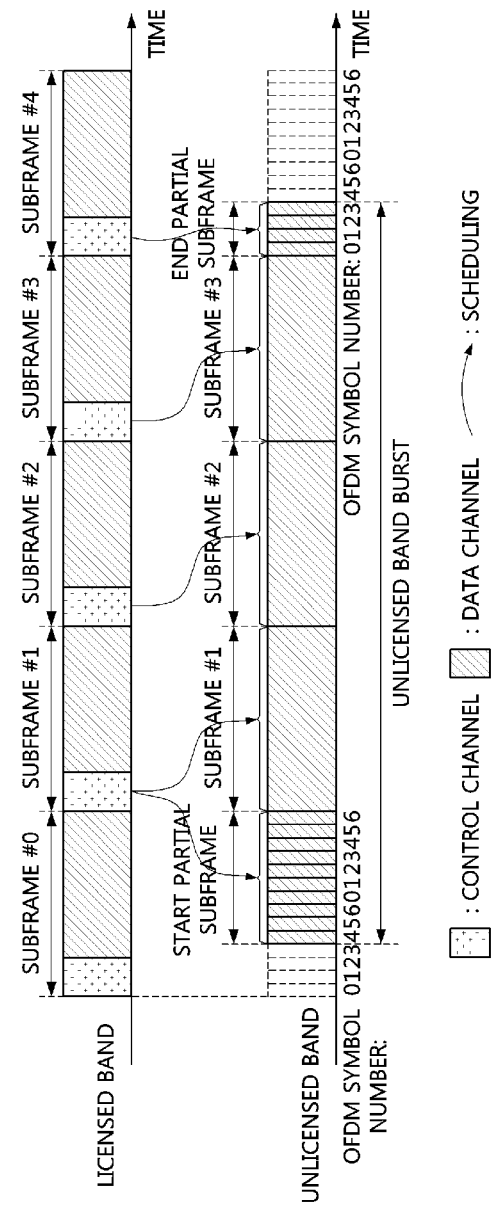
FIG. 13 is a timing diagram illustrating another embodiment of transmission of an unlicensed band burst based on cross-carrier scheduling.

FIG. 13 is a timing diagram illustrating another embodiment of transmission of an unlicensed band burst based on cross-carrier scheduling.

Referring to FIG. 13, a base station may transmit signals to an UE through a licensed band or an unlicensed band according to a carrier aggregation (CA). The base station and the UE may support at least one of the licensed band and the unlicensed band. Here, the base station and the UE may constitute one of the wireless communication networks explained by referring to FIGS. 1 to 4. Each of the base station and the UE may have a structure identical to or similar with the structure of the communication node 500 explained by referring to FIG. 5.

In the below description, transmission of an unlicensed band burst, for a case that a timing of a subframe (or, slot or OFDM symbol, etc.) of the licensed band is identical to a timing of a subframe (or, slot or OFDM symbol, etc.) of the unlicensed band, will be explained. Also, the below-explained transmission of the unlicensed band burst may be applied to a case that the timing of the subframe (or, slot or OFDM symbol, etc.) of the licensed band is different from the timing of the subframe (or, slot or OFDM symbol, etc.) of the unlicensed band. Here, the structures of the subframe and the unlicensed band burst may be identical to or similar with those of the subframe and the unlicensed band burst which were explained by referring to FIG. 10. Among the subframes of the unlicensed band, subframes (e.g., subframe#1, subframe#2, and subframe#3) except partial subframes may be scheduled based on the conventional cross-carrier scheduling method.

In the unlicensed band, the base station may transmit signals as follows.

The base station may transmit data to the UE through respective data channels (e.g., PDSCH) of a start partial subframe, a subframe#1, a subframe#2, a subframe#3, and an end partial subframe of the unlicensed band. Each of the start partial subframe, subframe#1, subframe#2, subframe#3, and end partial subframe of the unlicensed band may comprise both of control channel and data channel, or only data channel.

In a case that only scheduling information for PDSCH of the subframe#1 of the unlicensed band is transmitted through PDCCH (or, EPDCCH) of the subframe#1 of the licensed band, the base station may transmit data to the UE through PDSCH of the start partial subframe of the unlicensed band based on the scheduling information for PDSCH of the subframe#1 of the unlicensed band. Alternatively, in a case that respective scheduling information for PDSCHs of the start partial subframe and the subframe#1 of the unlicensed band are transmitted through PDCCH (or, EPDCCH) of the subframe#1 of the licensed band, the base station may transmit data to the UE through PDSCH of the start partial subframe of the unlicensed band indicated by the scheduling information for PDSCH of the start partial subframe of the unlicensed band.

Also, HARQ-related information for the start partial subframe of the unlicensed band, information on the length of the unlicensed band burst, information on the end point of the unlicensed band burst, information on the number of subframes remaining until the end point of the unlicensed band burst, etc. may be transmitted through at least one control channel (e.g., PDCCH, EPDCCH, PHICH, PCFICH, etc.) of the subframe#1 of the licensed band. Here, the transmission of HARQ-related information for the start partial subframe of the unlicensed band may be omitted.

Meanwhile, a DCI may further comprise a field indicating HARQ-related information for the start partial subframe of the unlicensed band. Alternatively, a new DCI may be defined as including fields indicating respective HARQ-related information for the start partial subframe and the subframe#1 of the unlicensed band. Alternatively, the size of field indicating HARQ-related information may be doubled, and the respective HARQ-related information for the start partial subframe and the subframe#1 of the unlicensed band may be transmitted through the field twice the size of the conventional field.

Scheduling information for PDSCH of the subframe#1 of the unlicensed band may be transmitted through PDCCH (or, EPDCCH) of the subframe#1 of the licensed band. In this case, the base station may transmit data to the UE through PDSCH of the subframe#1 of the unlicensed band indicated by the scheduling information transmitted through PDCCH (or, EPDCCH) of the subframe#1 of the licensed band. Also, HARQ-related information for the subframe#1 of the unlicensed band, information on the length of the unlicensed band burst, information on the end point of the unlicensed band burst, information on the number of subframes remaining until the end point of the unlicensed band burst, etc. may be transmitted through at least one control channel (e.g., PDCCH, EPDCCH, PHICH, PCFICH, etc.) of the subframe#1 of the licensed band.

Meanwhile, the DCI transmitted through the control channel of the subframe#1 of the licensed band may comprise a carrier indicator field (CIF) for the unlicensed band. In a case that scheduling information for the start partial subframe and the subframe#1 of the unlicensed band are transmitted through the control channel of the subframe#1 of the licensed band, a field for separating the scheduling information for the start partial subframe of the unlicensed band and the scheduling information for the subframe#1 of the unlicensed band may be added in the DCI of the control channel of the subframe#1 of the licensed band.

In consideration of limited resources for the control channel of the subframe#1 of the licensed band, the start partial subframe and the subframe#1 of the unlicensed band may be scheduled based on the same DCI. For example, the scheduling information for the subframe#1 of the unlicensed band may be transmitted through PDCCH (or, EPDCCH) of the subframe#1 of the licensed band. In this case, the start partial subframe of the unlicensed band may be scheduled based on the scheduling information for the subframe#1 of the unlicensed band.

Scheduling information for PDSCH of the subframe#2 of the unlicensed band may be transmitted through PDCCH (or, EPDCCH) of the subframe#2 of the licensed band. In this case, the base station may transmit data to the UE through PDSCH of the subframe#2 of the unlicensed band indicated by the scheduling information transmitted through PDCCH (or, EPDCCH) of the subframe#2 of the licensed band. Also, HARQ-related information for the subframe#2 of the unlicensed band, information on the length of the unlicensed band burst, information on the end point of the unlicensed band burst, information on the number of subframes remaining until the end point of the unlicensed band burst, etc. may be transmitted through at least one control channel (e.g., PDCCH, EPDCCH, PHICH, PCFICH, etc.) of the subframe#2 of the licensed band.

Scheduling information for PDSCH of the subframe#3 of the unlicensed band may be transmitted through PDCCH (or, EPDCCH) of the subframe#3 of the licensed band. In this case, the base station may transmit data to the UE through PDSCH of the subframe#3 of the unlicensed band indicated by the scheduling information transmitted through PDCCH (or, EPDCCH) of the subframe#3 of the licensed band. Also, HARQ-related information for the subframe#3 of the unlicensed band, information on the length of the unlicensed band burst, information on the end point of the unlicensed band burst, information on the number of subframes remaining until the end point of the unlicensed band burst, etc. may be transmitted through at least one control channel (e.g., PDCCH, EPDCCH, PHICH, PCFICH, etc.) of the subframe#3 of the licensed band.

Scheduling information for PDSCH of the end partial subframe of the unlicensed band may be transmitted through PDCCH (or, EPDCCH) of the subframe#4 of the licensed band. In this case, the base station may transmit data to the UE through PDSCH of the end partial subframe of the unlicensed band indicated by the scheduling information transmitted through PDCCH (or, EPDCCH) of the subframe#4 of the licensed band. Also, HARQ-related information for the end partial subframe of the unlicensed band, information on the length of the unlicensed band burst, information on the end point of the unlicensed band burst, information on the number of subframes remaining until the end point of the unlicensed band burst, etc. may be transmitted through at least one control channel (e.g., PDCCH, EPDCCH, PHICH, PCFICH, etc.) of the subframe#4 of the licensed band.

The signal transmitted by the base station in the unlicensed band as described above may be received at the UE as follows.

The UE may receive the start partial subframe of the unlicensed band. For example, the UE may obtain data through PDSCH of the start partial subframe of the unlicensed band indicated by the scheduling information received through PDCCH (or, EPDCCH) of the subframe#1 of the licensed band. HARQ-related information for the start partial subframe of the unlicensed band, information on the length of the unlicensed band burst, information on the end point of the unlicensed band burst, information on the number of subframes remaining until the end point of the unlicensed band burst, etc. may be obtained through at least one control channel (e.g., PDCCH, EPDCCH, PHICH, PCFICH, etc.) of the subframe#1 of the licensed band.

The UE may receive the subframe#1 of the unlicensed band. For example, the UE may obtain data through PDSCH of the subframe#1 of the unlicensed band indicated by the scheduling information received through PDCCH (or, EPDCCH) of the subframe#1 of the licensed band. HARQ-related information for the subframe#1 of the unlicensed band, information on the length of the unlicensed band burst, information on the end point of the unlicensed band burst, information on the number of subframes remaining until the end point of the unlicensed band burst, etc. may be obtained through at least one control channel (e.g., PDCCH, EPDCCH, PHICH, PCFICH, etc.) of the subframe#1 of the licensed band.

The UE may receive the subframe#2 of the unlicensed band. For example, the UE may obtain data through PDSCH of the subframe#2 of the unlicensed band indicated by the scheduling information received through PDCCH (or, EPDCCH) of the subframe#2 of the licensed band. HARQ-related information for the subframe#2 of the unlicensed band, information on the length of the unlicensed band burst, information on the end point of the unlicensed band burst, information on the number of subframes remaining until the end point of the unlicensed band burst, etc. may be obtained through at least one control channel (e.g., PDCCH, EPDCCH, PHICH, PCFICH, etc.) of the subframe#2 of the licensed band.

The UE may receive the subframe#3 of the unlicensed band. For example, the UE may obtain data through PDSCH of the subframe#3 of the unlicensed band indicated by the scheduling information received through PDCCH (or, EPDCCH) of the subframe#3 of the licensed band. HARQ-related information for the subframe#3 of the unlicensed band, information on the length of the unlicensed band burst, information on the end point of the unlicensed band burst, information on the number of subframes remaining until the end point of the unlicensed band burst, etc. may be obtained through at least one control channel (e.g., PDCCH, EPDCCH, PHICH, PCFICH, etc.) of the subframe#3 of the licensed band.

The UE may receive the end partial subframe of the unlicensed band. For example, the UE may obtain data through PDSCH of the end partial subframe of the unlicensed band indicated by the scheduling information received through PDCCH (or, EPDCCH) of the subframe#4 of the licensed band. HARQ-related information for the end partial subframe of the unlicensed band, information on the length of the unlicensed band burst, information on the end point of the unlicensed band burst, information on the number of subframes remaining until the end point of the unlicensed band burst, etc. may be obtained through at least one control channel (e.g., PDCCH, EPDCCH, PHICH, PCFICH, etc.) of the subframe#4 of the licensed band.

Meanwhile, a semi-persistent scheduling (SPS) may be used for an unlicensed band burst which is transmitted discontinuously. When scheduling information for a data channel of a subframe included in the unlicensed band burst cannot be transmitted through a control channel in the corresponding subframe, the SPS may be used. In the case that the SPS is used, the same scheduling may be applied to continuous x subframes (e.g., subframes included in the unlicensed band burst). Here, x is a positive integer which is not less than 2. For example, if a same scheduling is applied to continuous 10 subframes, resource allocation, MCS, etc. for subframe#0 to subframe#9 may be identically configured. That is, the resource allocation and MCS may be configured identically for the unlicensed band burst (or, during an effective period of SPS). The effective period of SPS may be configured separately. When the effective period of SPS expires or additional scheduling is performed during the effective period of SPS, the SPS may be finished. Meanwhile, configuration information (e.g., HARQ-related information, etc.) may be set for respective subframes included in the unlicensed band burst to which the SPS is applied. For example, in a case that HARQ-related information (e.g., HARQ process number, RV, etc.) is configured differently for each subframe, the HARQ-related information may be scheduled individually through a control channel of each subframe (or, subframe of PCell) to which the HARQ-related information is applied. When the SPS is used, the transmission of the unlicensed band burst may be performed as follows.

Figure 14:
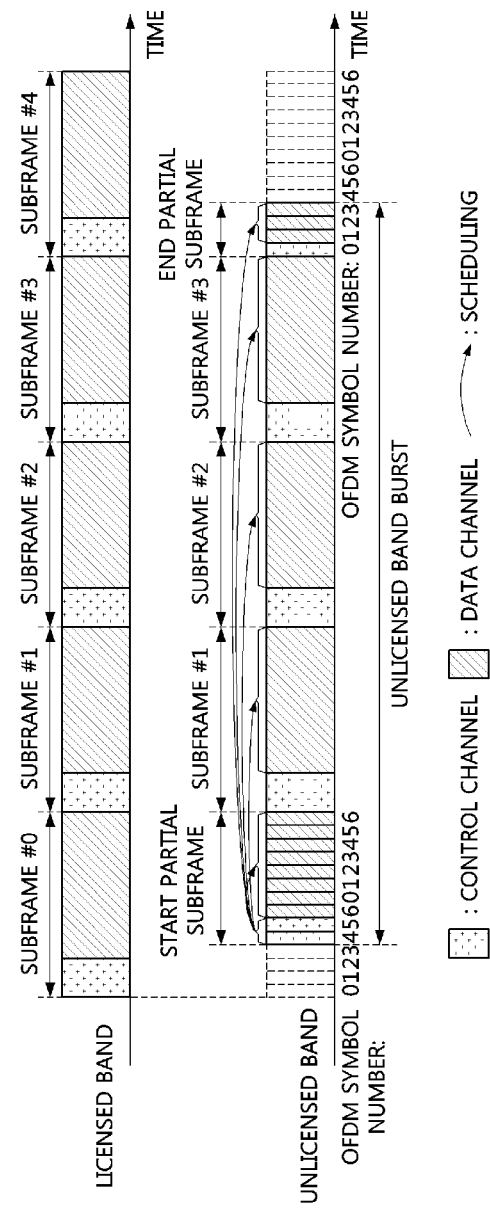
FIG. 14 is a timing diagram illustrating an embodiment for transmission of an unlicensed band burst based on semi-persistent scheduling.

FIG. 14 is a timing diagram illustrating an embodiment for transmission of an unlicensed band burst based on semi-persistent scheduling.

Referring to FIG. 14, a base station may transmit signals to an UE through a licensed band or an unlicensed band according to a carrier aggregation (CA). The base station and the UE may support at least one of the licensed band and the unlicensed band. Here, the base station and the UE may constitute one of the wireless communication networks explained by referring to FIGS. 1 to 4. Each of the base station and the UE may have a structure identical to or similar with the structure of the communication node 500 explained by referring to FIG. 5.

In the below description, transmission of an unlicensed band burst, for a case that a timing of a subframe (or, slot or OFDM symbol, etc.) of the licensed band is identical to a timing of a subframe (or, slot or OFDM symbol, etc.) of the unlicensed band, will be explained. Also, the below-explained transmission of the unlicensed band burst may be applied to a case that the timing of the subframe (or, slot or OFDM symbol, etc.) of the licensed band is different from the timing of the subframe (or, slot or OFDM symbol, etc.) of the unlicensed band. Here, the structures of the subframe and the unlicensed band burst may be identical to or similar with those of the subframe and the unlicensed band burst which were explained by referring to FIG. 10.

In the unlicensed band, the base station may transmit signals as follows.

The length of the effective period of SPS may be identical to that of the unlicensed band burst. Alternatively, if the length of the unlicensed band burst is not known, the SPS may be applied until the end point of the unlicensed band burst.

In a case that the self-scheduling is used, the base station may transmit to the UE control information (e.g., resource allocation information, MCS information, etc.) which are applied to all subframes constituting the unlicensed band burst through PDCCH (or, EPDCCH) of the start partial subframe or the subframe#1 of the unlicensed band. The base station may transmit data to the UE through each PDSCH (e.g., each PDSCH of the start partial subframe, subframe#1, subframe#2, subframe#3, and end partial subframe of the unlicensed band burst) indicated by the control information transmitted through PDCCH (or, EPDCCH) of the start partial subframe or subframe#1 of the unlicensed band burst.

Also, the base station may transmit to the UE HARQ-related information (e.g., HARQ process number, RV, etc.) for each of the start partial subframe, subframe#1, subframe#2, subframe#3, and end partial subframe of the unlicensed band, information on the length of the unlicensed band burst, information on the end point of the unlicensed band burst, information on the number of subframes remaining until the end point of the unlicensed band burst, etc. through each control channel of the start partial subframe, subframe#1, subframe#2, subframe#3, and end partial subframe of the unlicensed band. Here, the HARQ-related information may be configured differently for each subframe included in the unlicensed band burst.

In a case that the cross-carrier scheduling is used, the base station may transmit to the UE control information (e.g., resource allocation information, MCS information, etc.) which are applied to all subframes constituting the unlicensed band burst through PDCCH (or, EPDCCH) of the subframe#0 or the subframe#1 of the licensed band. The base station may transmit data to the UE through each PDSCH (e.g., each PDSCH of the start partial subframe, subframe#1, subframe#2, subframe#3, and end partial subframe of the unlicensed band burst) indicated by the control information transmitted through PDCCH (or, EPDCCH) of the subframe#0 or subframe#1 of the licensed band.

Also, the base station may transmit to the UE HARQ-related information (e.g., HARQ process number, RV, etc.) for each of the start partial subframe, subframe#1, subframe#2, subframe#3, and end partial subframe of the unlicensed band, information on the length of the unlicensed band burst, information on the end point of the unlicensed band burst, information on the number of subframes remaining until the end point of the unlicensed band burst, etc. through each control channel of the subframe#0, subframe#1, subframe#2, subframe#3, and subframe#4 of the licensed band. Here, the HARQ-related information may be configured differently for each subframe included in the unlicensed band burst.

The signal transmitted by the base station in the unlicensed band as described above may be received at the UE as follows.

In a case that the self-scheduling is used, the UE may obtain control information (e.g., resource allocation information, MCS information, etc.) which are applied to all subframes constituting the unlicensed band burst through PDCCH (or, EPDCCH) of the start partial subframe or the subframe#1 of the unlicensed band. The UE may receive data through PDSCH (e.g., each PDSCH of the start partial subframe, subframe#1, subframe#2, subframe#3, and end partial subframe of the unlicensed band burst) indicated by the obtained control information.

Also, the UE may obtain HARQ-related information (e.g., HARQ process number, RV, etc.) for each of the start partial subframe, subframe#1, subframe#2, subframe#3, and end partial subframe of the unlicensed band, information on the length of the unlicensed band burst, information on the end point of the unlicensed band burst, information on the number of subframes remaining until the end point of the unlicensed band burst, etc. through each control channel of the start partial subframe, subframe#1, subframe#2, subframe#3, and end partial subframe of the unlicensed band. Here, the HARQ-related information may be configured differently for each subframe included in the unlicensed band burst.

In a case that the cross-carrier scheduling is used, the UE may obtain control information (e.g., resource allocation information, MCS information, etc.) which are applied to all subframes constituting the unlicensed band burst through PDCCH (or, an EPDCCH) of the subframe#0 or the subframe#1 of the licensed band. The UE may receive data through PDSCH (e.g., each PDSCH of the start partial subframe, subframe#1, subframe#2, subframe#3, and end partial subframe of the unlicensed band burst) indicated by the obtained control information.

Also, the UE may obtain HARQ-related information (e.g., HARQ process number, RV, etc.) for each of the start partial subframe, subframe#1, subframe#2, subframe#3, and end partial subframe of the unlicensed band, information on the length of the unlicensed band burst, information on the end point of the unlicensed band burst, information on the number of subframes remaining until the end point of the unlicensed band burst, etc. through each control channel of the subframe#0, subframe#1, subframe#2, subframe#3, and subframe#4 of the licensed band, etc. Here, the HARQ-related information may be configured differently for each subframe included in the unlicensed band burst.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a user equipment (UE) in a communication network supporting a licensed band and an unlicensed band, the method comprising:
   obtaining a control channel from a partial subframe having a length of less than 1 millisecond in the unlicensed band;
   obtaining scheduling information from the control channel which is obtained in the unlicensed band; and
   obtaining a data channel indicated by the scheduling information from the partial subframe,
   wherein the partial subframe configured in the unlicensed band includes a plurality of symbols,
   the control channel is allocated in two or more symbols among the plurality of symbols,
   the data channel is allocated in remaining symbols except for the two or more symbols among the plurality of symbols,
   each subframe except the partial subframe in the unlicensed band comprises a first slot and a second slot each of which comprises orthogonal frequency division multiplexing (OFDM) symbol#0 to symbol#6, and
   a start OFDM symbol of the partial subframe corresponds to an OFDM symbol#0 included in the second slot.

2. The method according to claim 1, wherein the control channel is a physical downlink control channel (PDCCH) or an enhanced PDCCH (EPDCCH).

3. The method according to claim 1, wherein the partial subframe is a start partial subframe or an end partial subframe among a plurality of subframes constituting a transmission burst.

4. The method according to claim 1, wherein, when the UE operates based on a semi-persistent scheduling (SPS), the scheduling information is applied to all subframes belonging to an effective period of the SPS.

5. The method according to claim 1, wherein, when the UE operates based on a semi-persistent scheduling (SPS), control information configured for all subframes belonging to an effective period of the SPS is transmitted through a subframe to which the control information is applied.

6. An operation method of a base station in a communication network supporting a licensed band and an unlicensed band, the method comprising:
   generating scheduling information indicating a resource through which a data channel is transmitted;
   transmitting a control channel including the scheduling information through a partial subframe having a length of less than 1 millisecond in the unlicensed band; and
   transmitting the data channel through the resource which is indicated by the scheduling information in the partial subframe,
   wherein the partial subframe configured in the unlicensed band includes a plurality of symbols,
   the control channel is allocated in two or more symbols among the plurality of symbols,
   the data channel is allocated in remaining symbols except for the two or more symbols among the plurality of symbols,
   each subframe except the partial subframe in the unlicensed band comprises a first slot and a second slot each of which comprises orthogonal frequency division multiplexing (OFDM) symbol#0 to symbol#6, and
   a start OFDM symbol of the partial subframe corresponds to an OFDM symbol#0 included in the second slot.

7. The method according to claim 6, wherein the control channel is a physical downlink control channel (PDCCH) or an enhanced PDCCH (EPDCCH).

8. The method according to claim 6, wherein the partial subframe is a start partial subframe or an end partial subframe among a plurality of subframes constituting a transmission burst.

9. The method according to claim 6, wherein, when the base station operates based on a semi-persistent scheduling (SPS), the scheduling information is applied to all subframes belonging to an effective period of the SPS.

10. The method according to claim 6, wherein, when the base station operates based on a semi-persistent scheduling (SPS), control information configured for all subframes belonging to an effective period of the SPS is transmitted through a subframe to which the control information is applied.

11. A user equipment (UE) supporting an unlicensed band comprises:
    a processor; and
    a memory storing at least one command which is executed by the processor,
    wherein the at least one command is executed to obtain a control channel from a partial subframe having a length of less than 1 millisecond in the unlicensed band, obtain scheduling information from the control channel which is obtained in the unlicensed band, and obtain a data channel indicated by the scheduling information from the partial subframe,
    wherein the partial subframe configured in the unlicensed band includes a plurality of symbols,
    the control channel is allocated in two or more symbols among the plurality of symbols,
    the data channel is allocated in remaining symbols except for the two or more symbols among the plurality of symbols,
    each subframe except the partial subframe in the unlicensed band comprises a first slot and a second slot each of which comprises orthogonal frequency division multiplexing (OFDM) symbol#0 to symbol#6, and
    a start OFDM symbol of the partial subframe corresponds to an OFDM symbol#0 included in the second slot.

12. The UE according to claim 11, wherein the partial subframe is a start partial subframe or an end partial subframe among a plurality of subframes constituting a transmission burst.

13. The UE according to claim 11, wherein, when the UE operates based on a semi-persistent scheduling (SPS), the scheduling information is applied to all subframes belonging to an effective period of the SPS.

14. The UE according to claim 11, wherein, when the UE operates based on a semi-persistent scheduling (SPS), control information configured for all subframes belonging to an effective period of the SPS is transmitted through a subframe to which the control information is applied.

* * * * *